(12) United States Patent
Muramatsu et al.

(10) Patent No.: US 7,537,437 B2
(45) Date of Patent: May 26, 2009

(54) LINEAR ACTUATOR, AND VALVE DEVICE AND PUMP DEVICE USING THE SAME

(75) Inventors: Kenji Muramatsu, Nagano (JP);
Hiroshi Sugihara, Nagano (JP);
Kiyotsugu Takasawa, Nagano (JP);
Mitsuo Yokozawa, Nagano (JP)

(73) Assignee: Nidec Sankyo Corporation (JP)

( * ) Notice: Subject to any disclaimer, the term of this patent is extended or adjusted under 35 U.S.C. 154(b) by 407 days.

(21) Appl. No.: 11/290,979

(22) Filed: Nov. 30, 2005

(65) Prior Publication Data

US 2006/0145797 A1 Jul. 6, 2006

(30) Foreign Application Priority Data

| Nov. 30, 2004 | (JP) | ............................. 2004-347701 |
| Dec. 17, 2004 | (JP) | ............................. 2004-365924 |
| Feb. 18, 2005 | (JP) | ............................. 2005-043141 |

(51) Int. Cl.
*F04B 17/00* (2006.01)

(52) U.S. Cl. .................. 417/413.1; 417/410.1; 417/356

(58) Field of Classification Search ................. 417/356, 417/410.1, 413.1, 417, 395

See application file for complete search history.

(56) References Cited

U.S. PATENT DOCUMENTS

| 4,276,003 | A | * | 6/1981 | Perkins et al. | ............... 417/415 |
| 4,277,706 | A | * | 7/1981 | Isaacson | ...................... 310/80 |
| 6,068,198 | A | * | 5/2000 | Gupta | .......................... 239/1 |
| 7,293,967 | B2 | * | 11/2007 | Fukano et al. | ........... 417/413.1 |

FOREIGN PATENT DOCUMENTS

| JP | 10-184534 | 7/1998 |
| JP | 2002-206484 | 7/2002 |
| JP | 2004-152741 | 5/2004 |

\* cited by examiner

*Primary Examiner*—Charles G Freay
*Assistant Examiner*—Peter J Bertheaud
(74) *Attorney, Agent, or Firm*—Cantor Colburn LLP

(57) ABSTRACT

A linear actuator may include a fixed body having a coil wound around in a ring-shaped manner and a movable body. The movable body may include a first movable body side yoke which is disposed on the inner side of the coil and a pair of magnets which is laminated on both sides in an axial direction of the first movable body side yoke such that the same polarities of the magnets face the first movable body side yoke. The movable body may be driven in the axial direction. The linear actuator may be applied to a valve device and a pump device.

6 Claims, 20 Drawing Sheets

[Fig. 1]
(a)
(b)
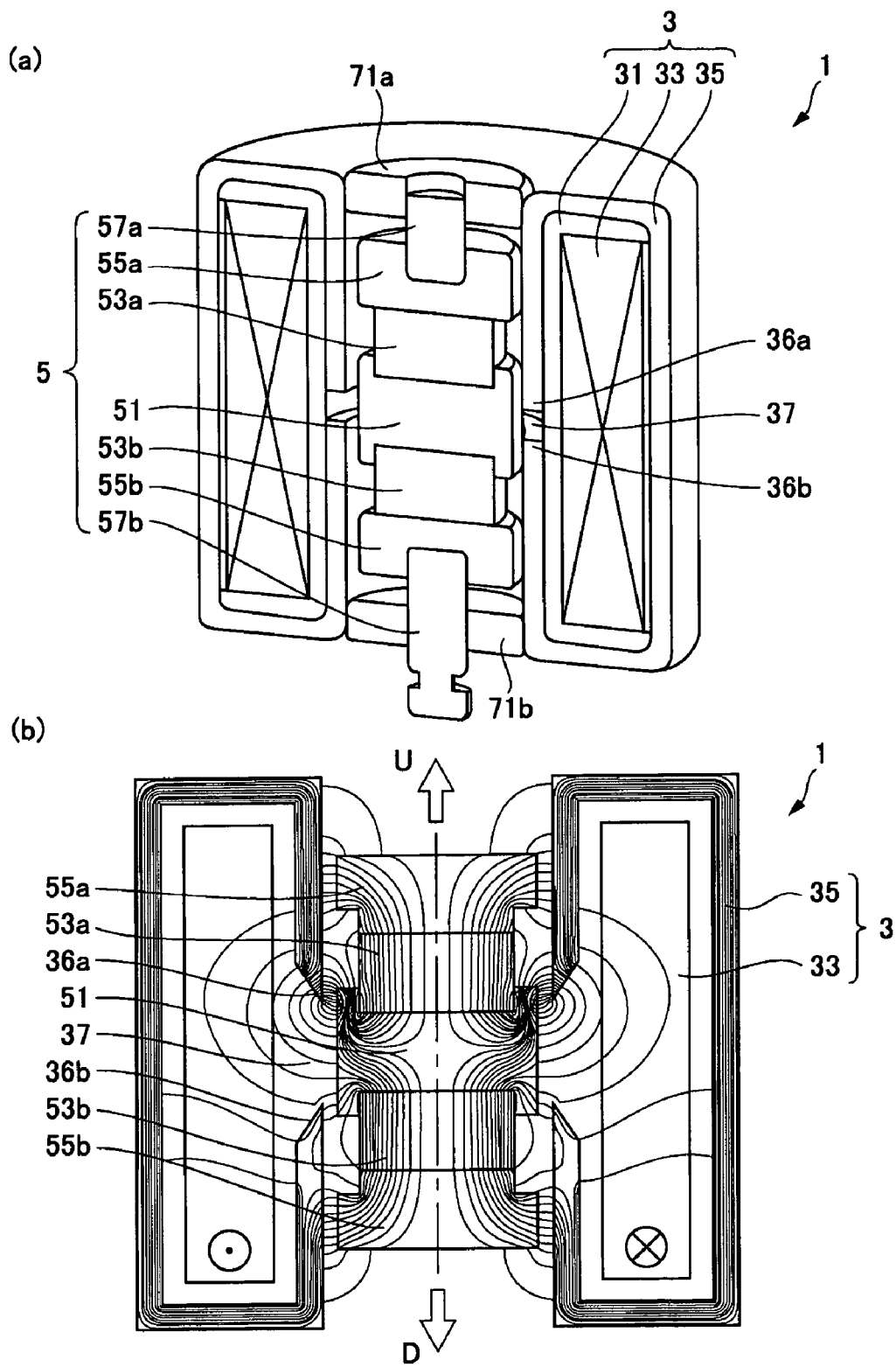

[Fig. 2]
(a)
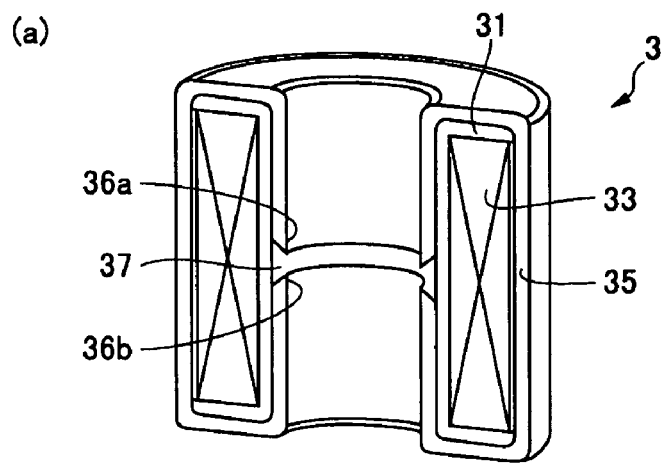
(b)
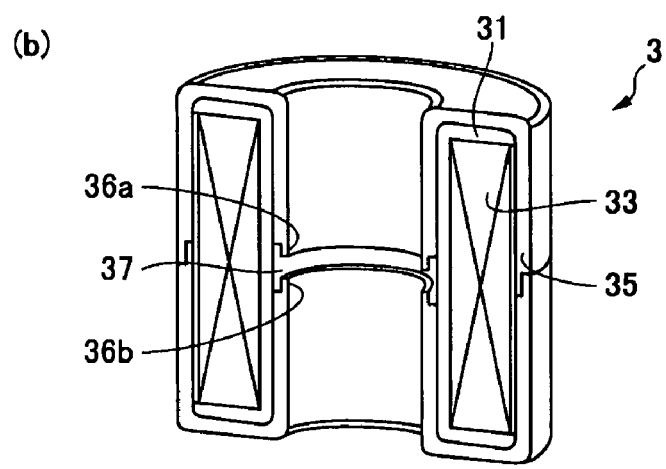
(c)
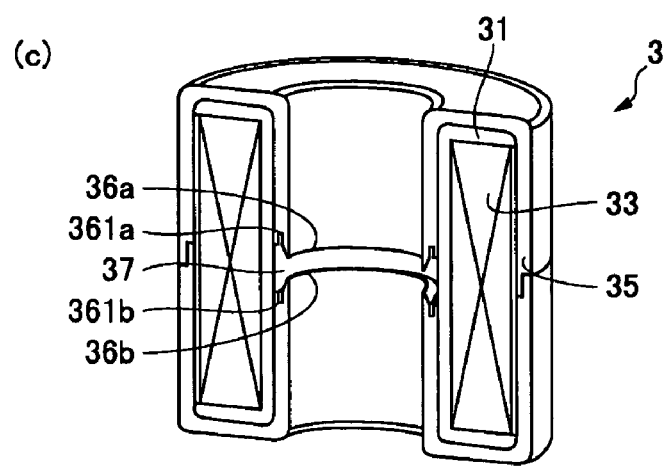

[Fig. 3]
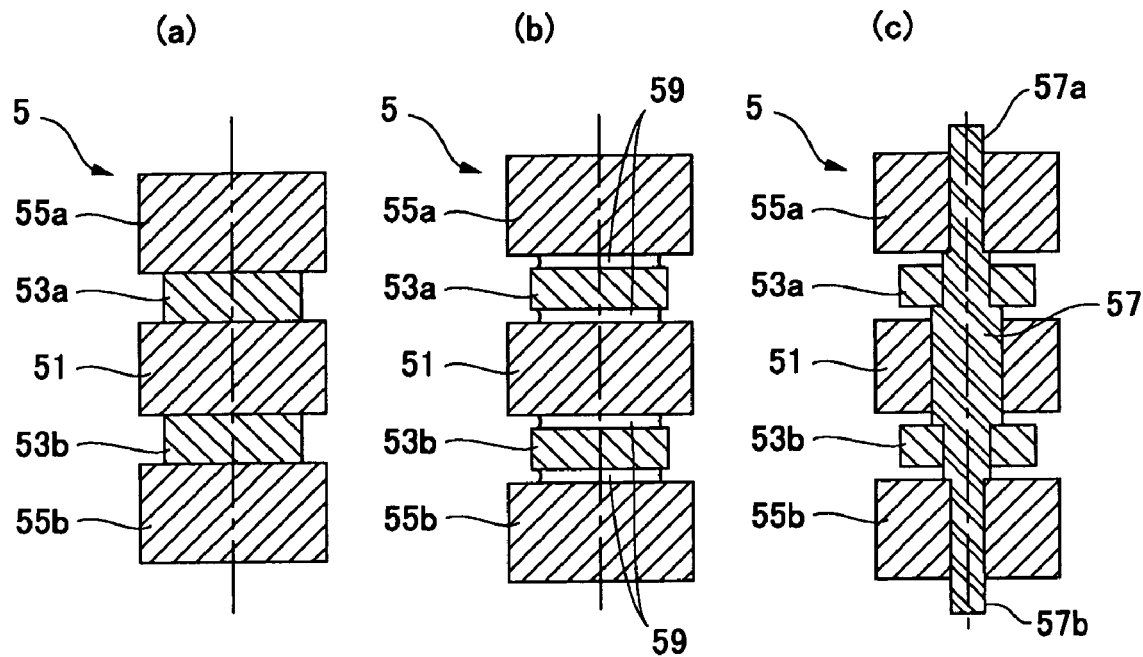
[Fig. 4]
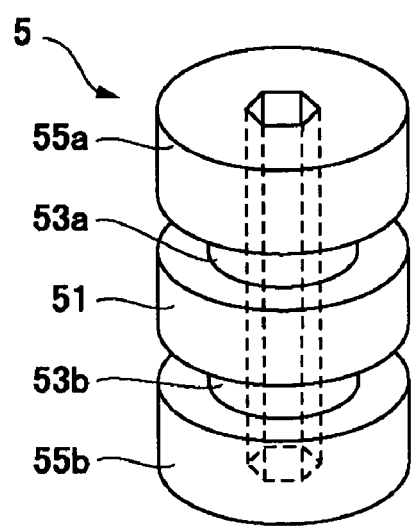

[Fig. 5]
(a)
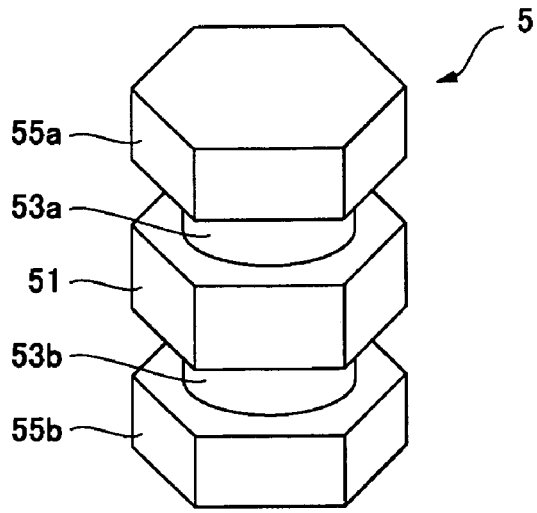
(b)
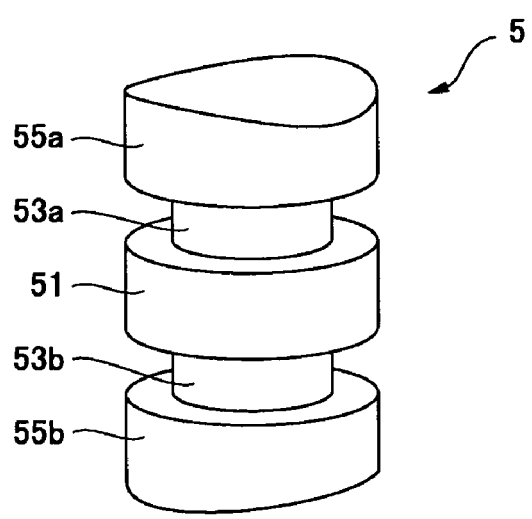
(c)
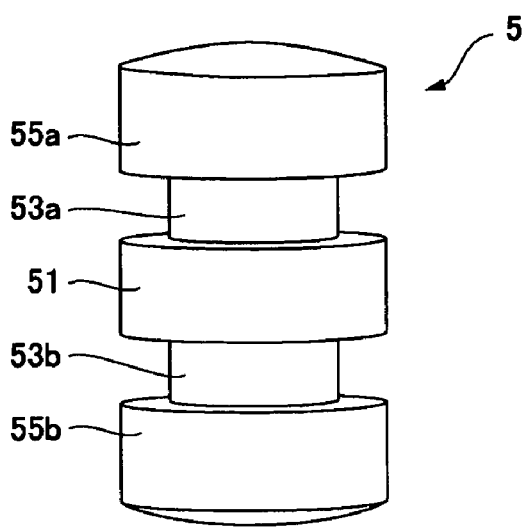

[Fig. 6]
(a)
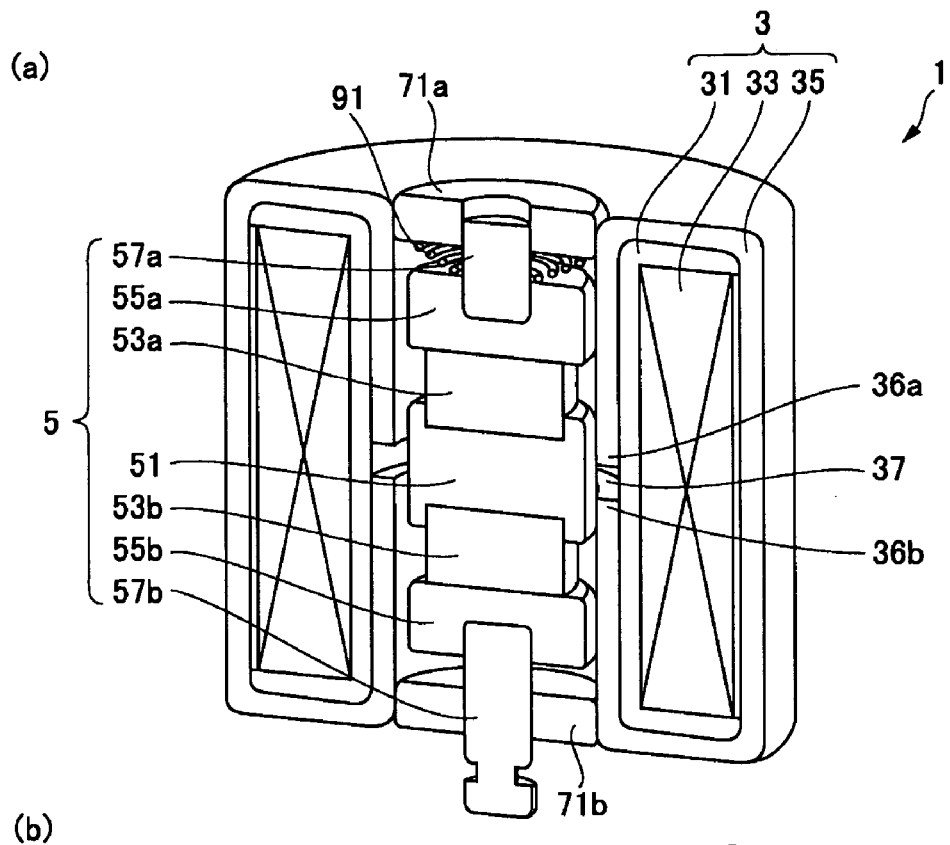
(b)
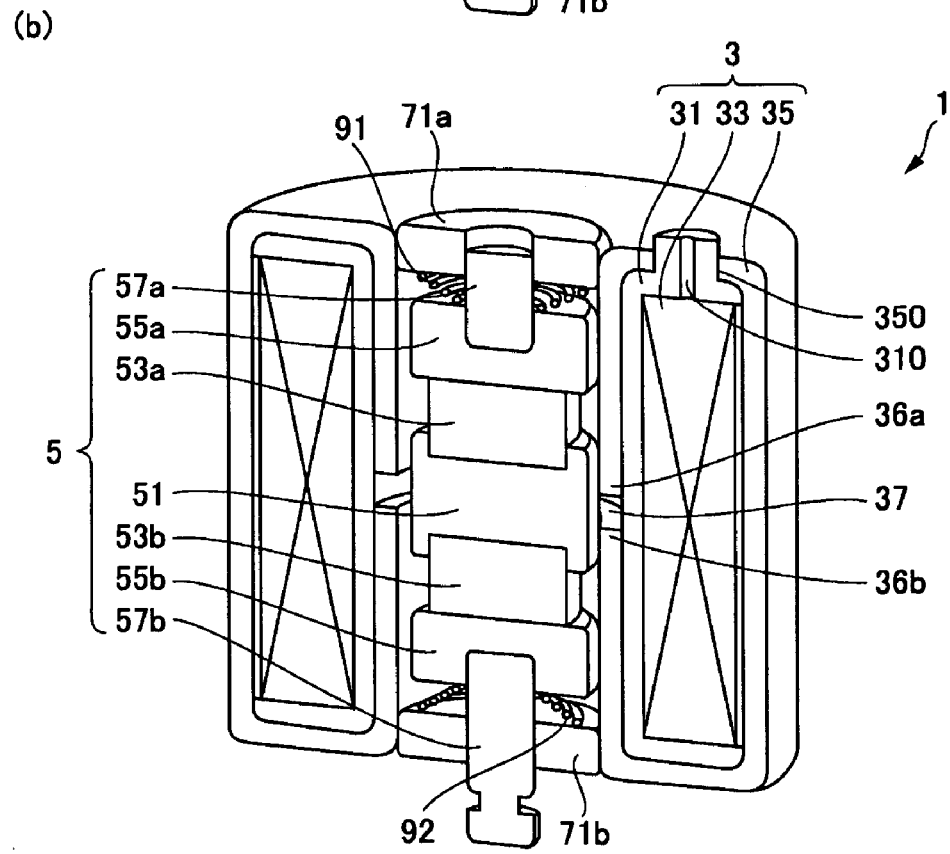

[Fig. 7]
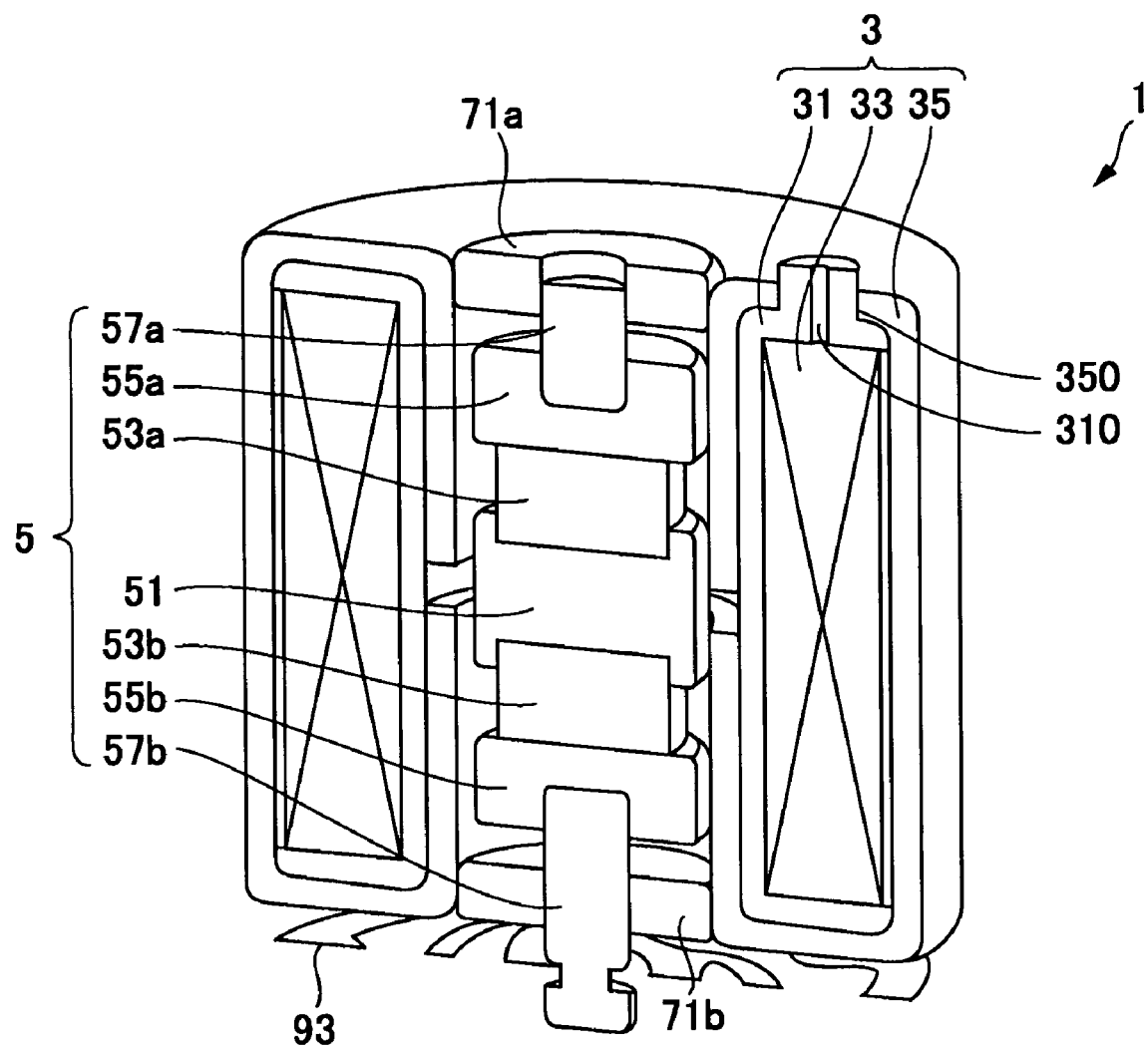

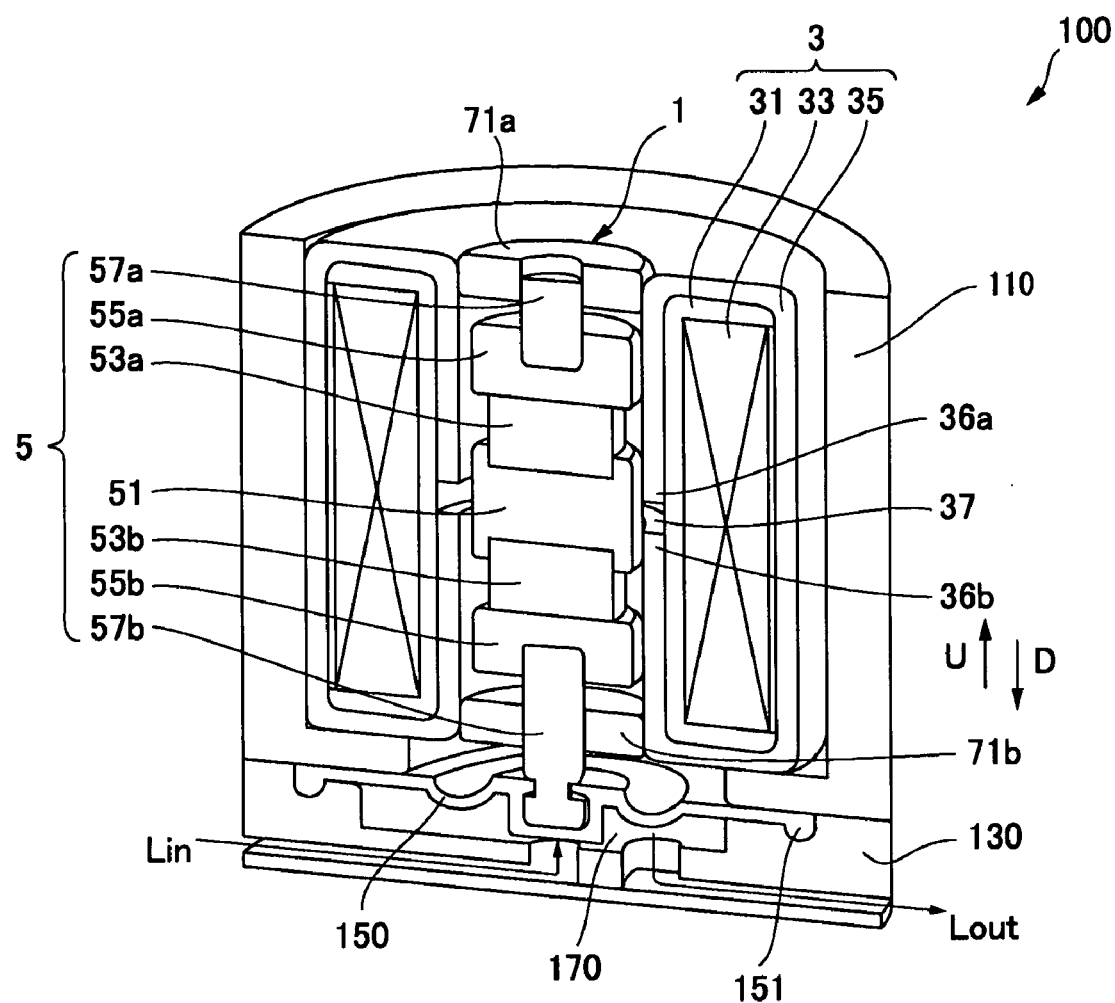
[Fig. 8]

[Fig. 9]
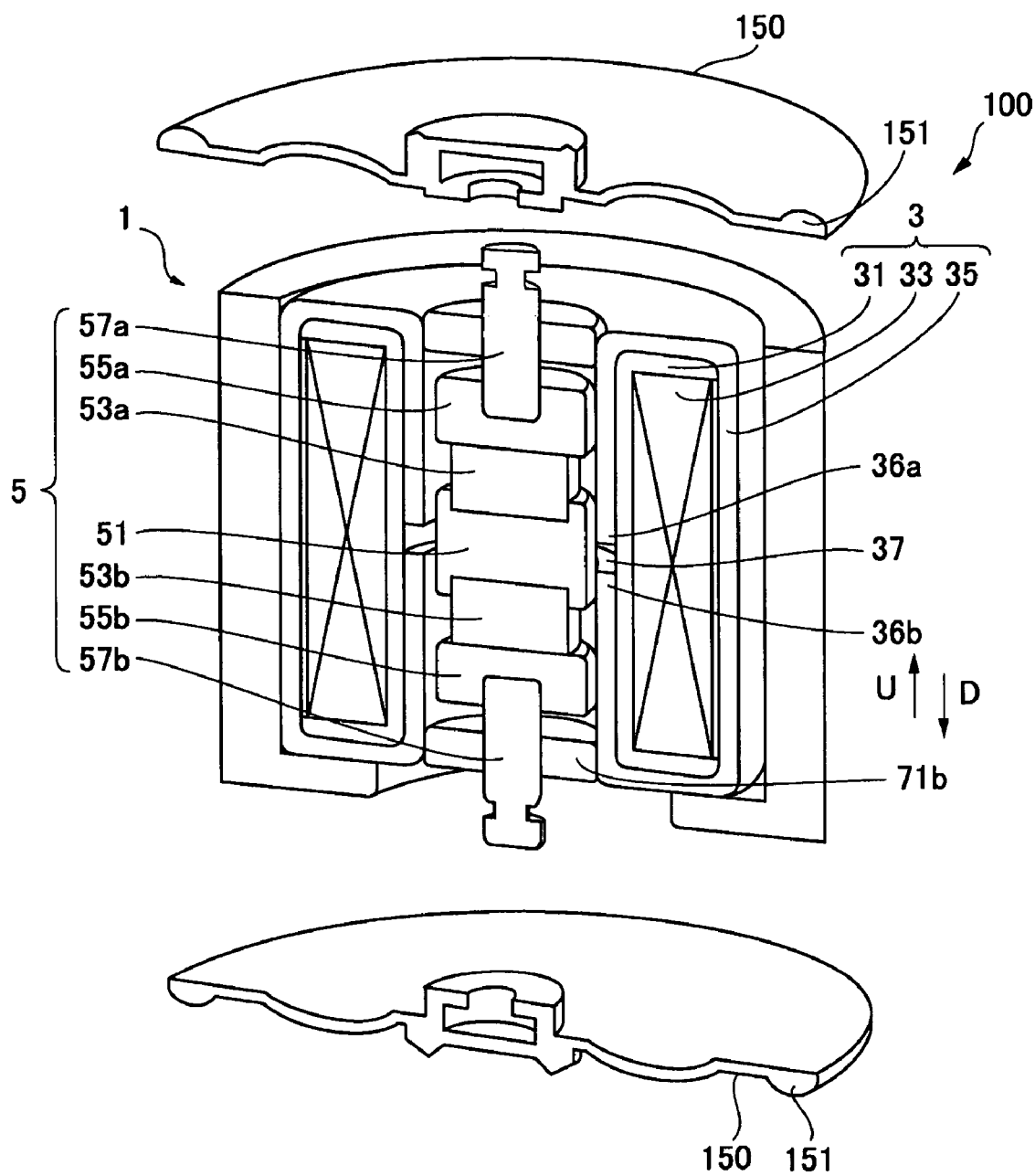

[Fig. 10]
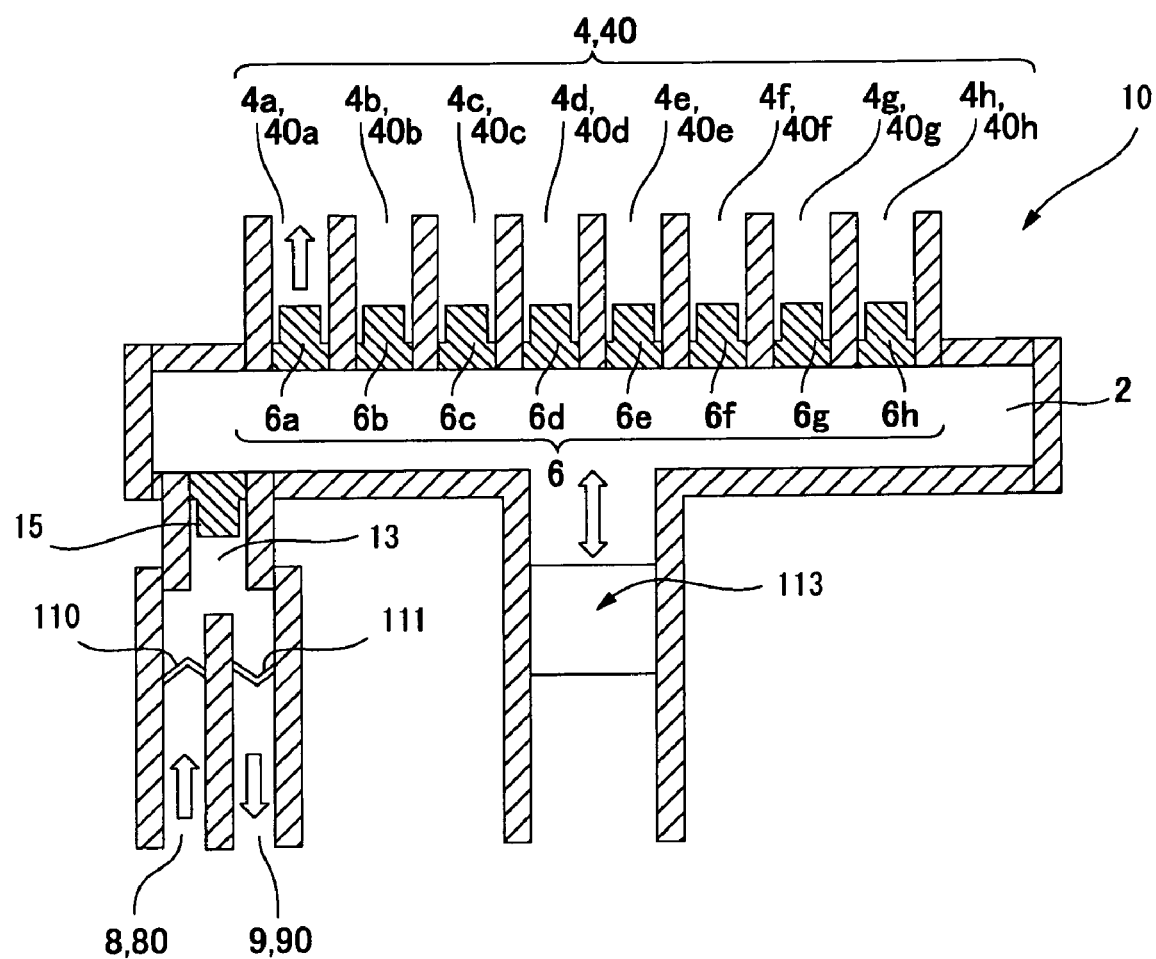

[Fig. 11]
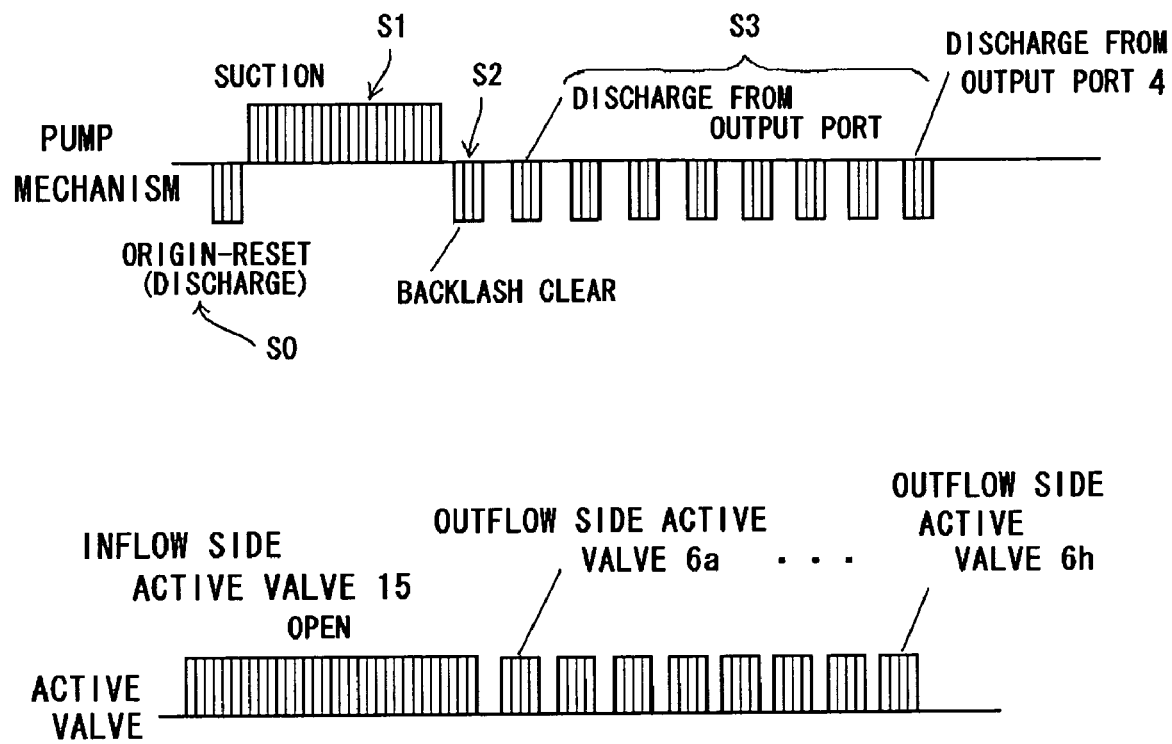

[Fig. 12]
(a)
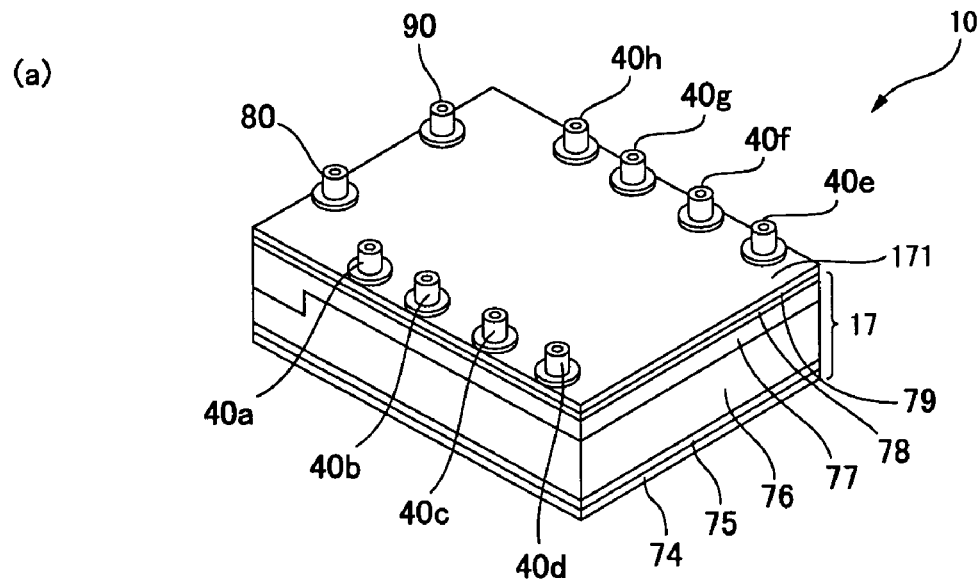
(b)
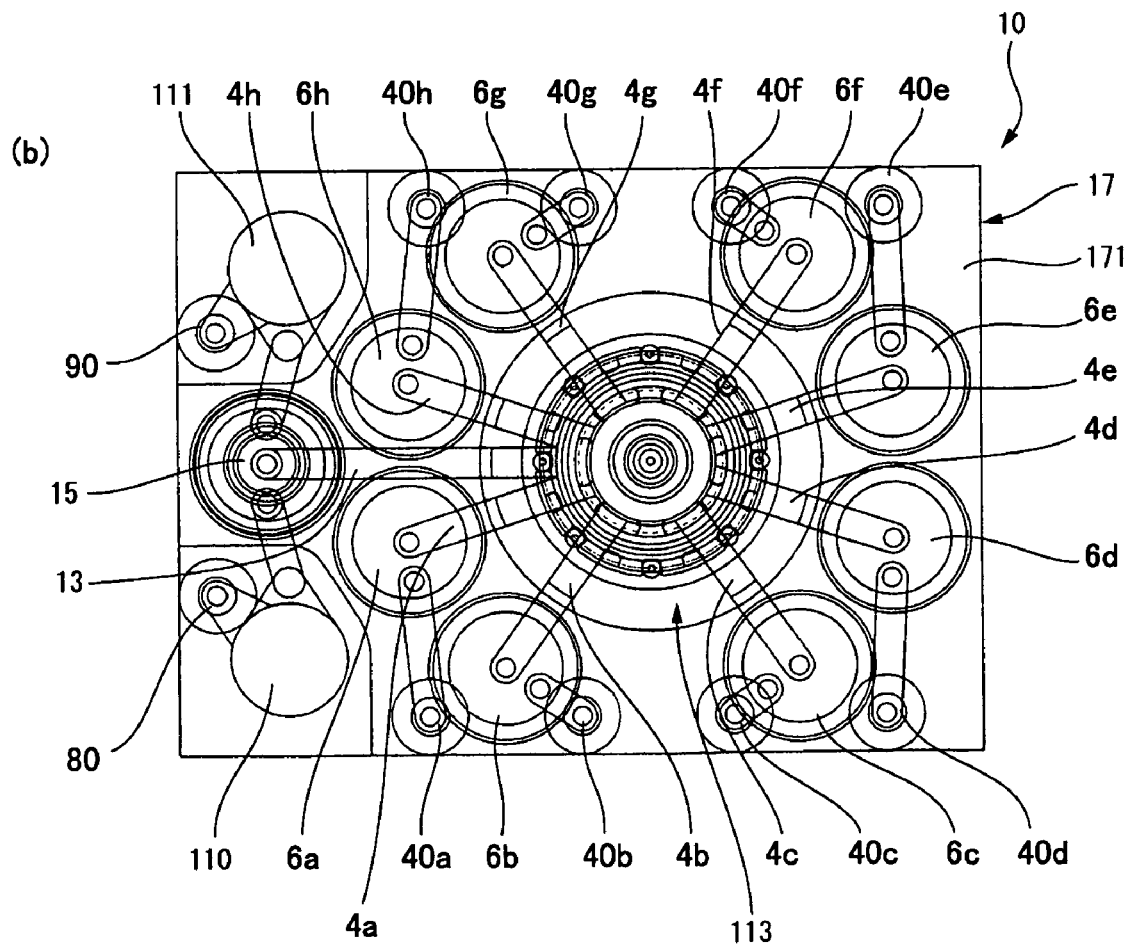

[Fig. 13]
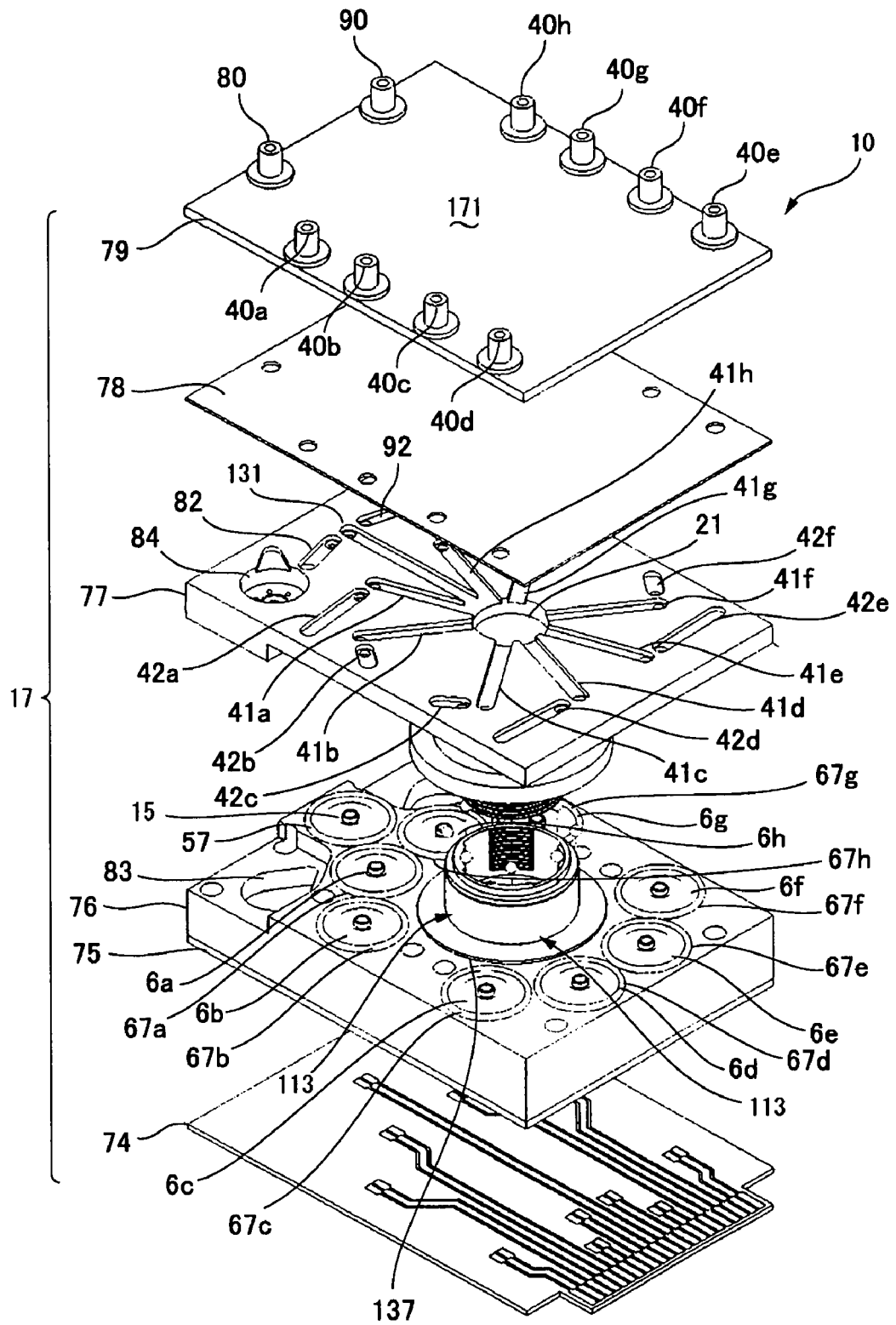

[Fig. 14]
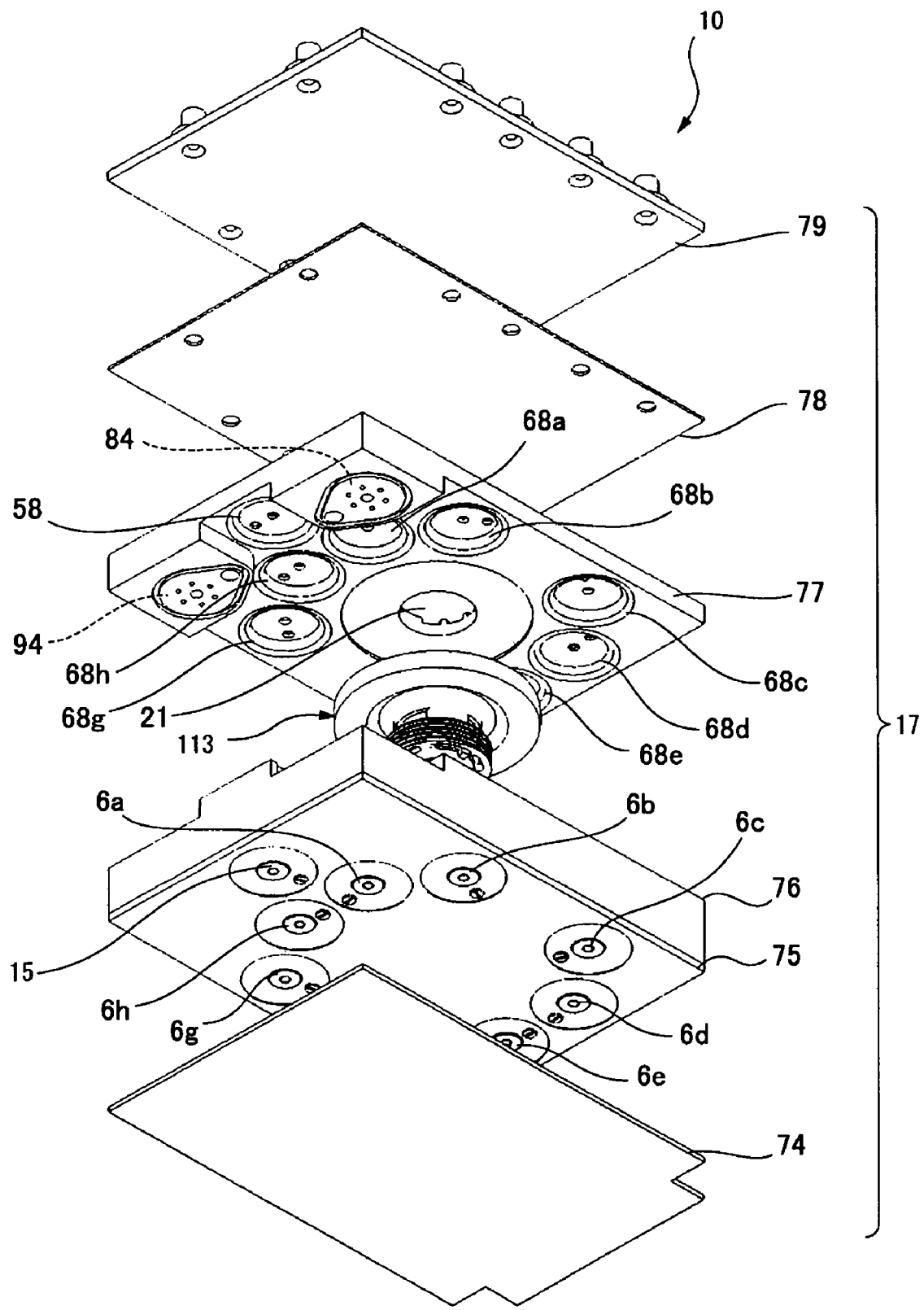

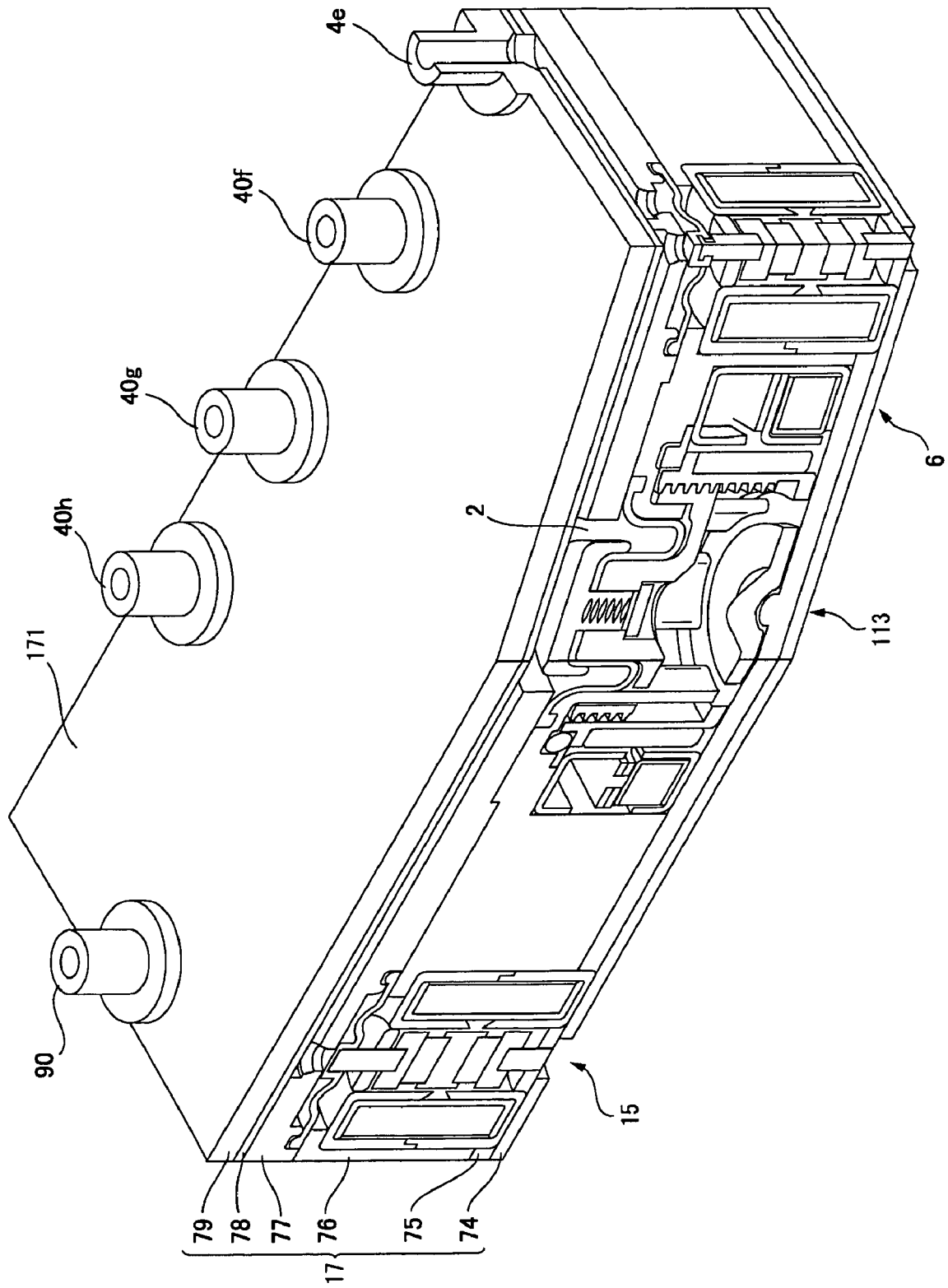
[Fig. 15]

[Fig. 16]
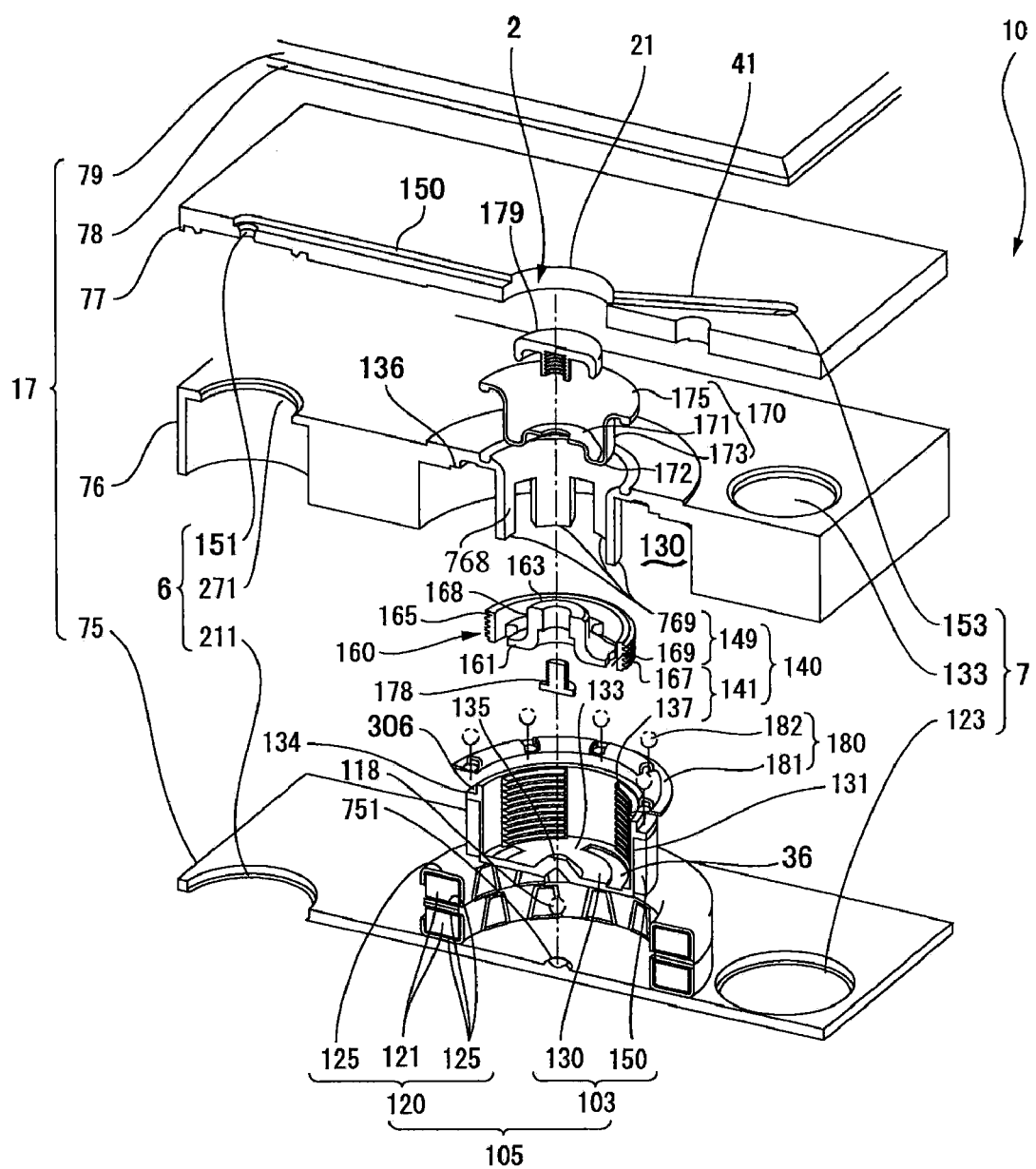

[Fig. 17]
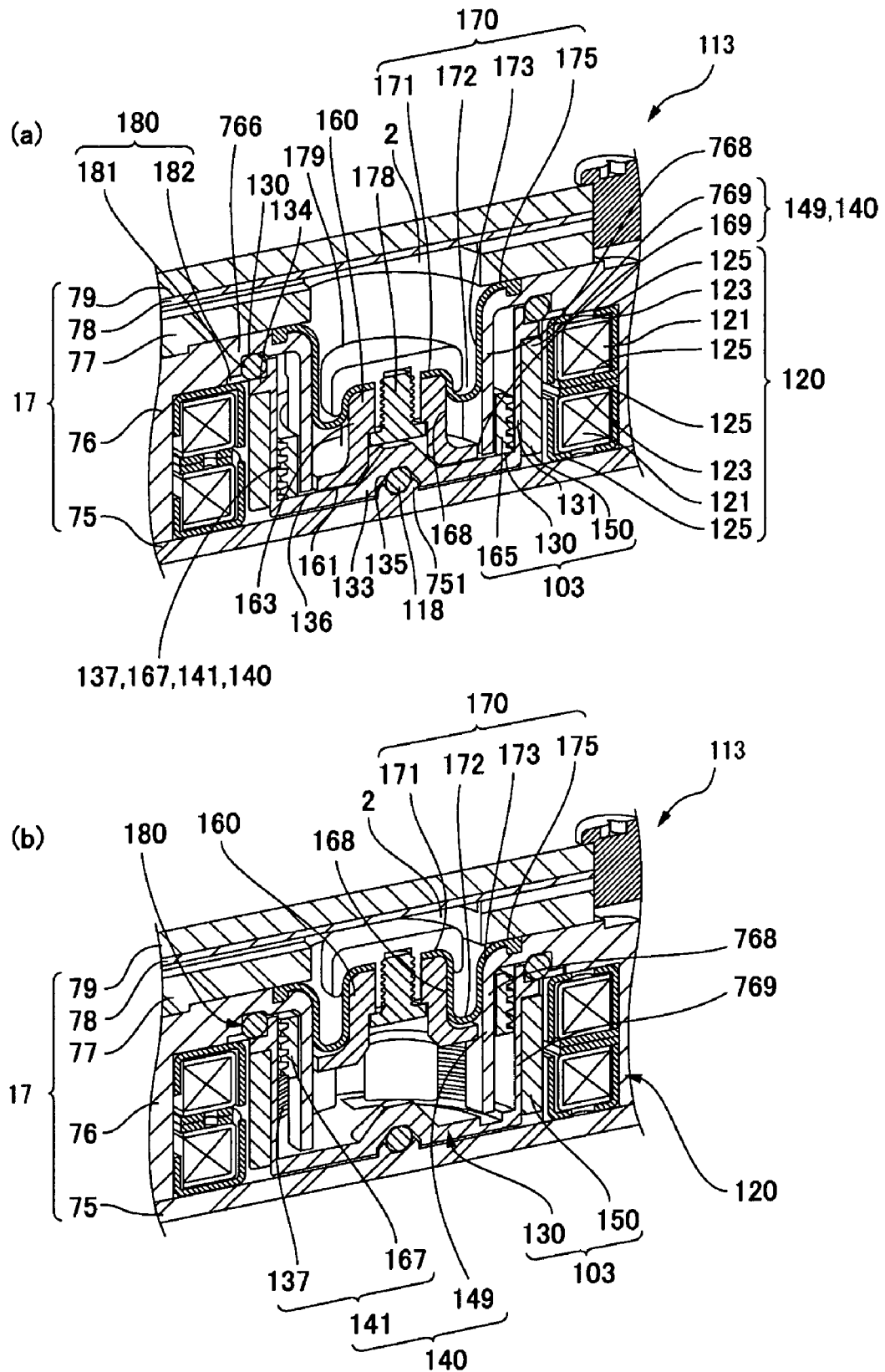

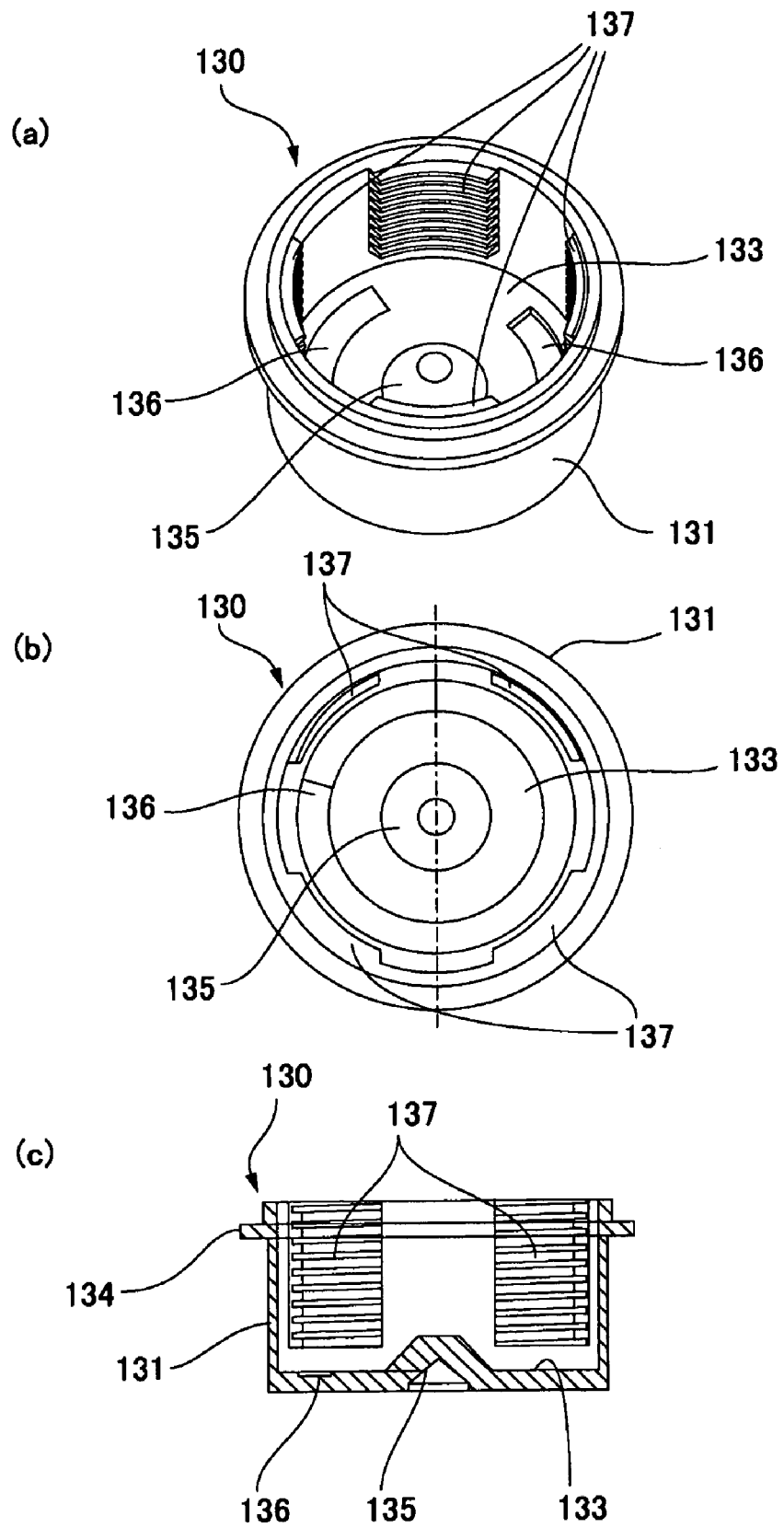
[Fig. 18]

[Fig. 19]
(a) 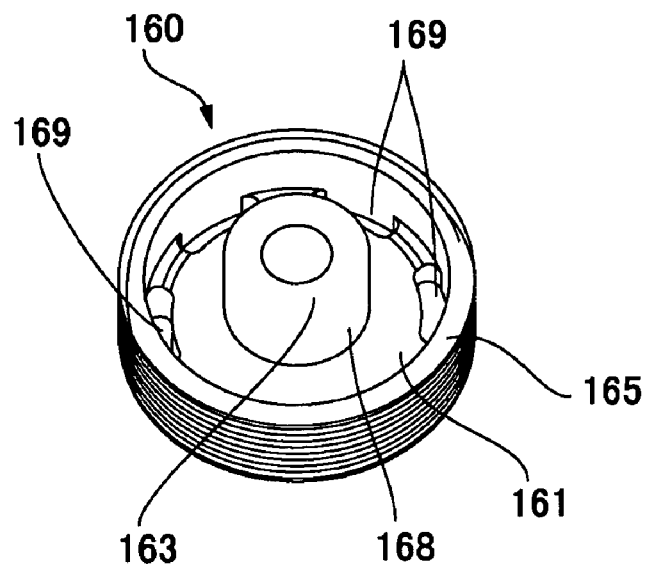
(b) 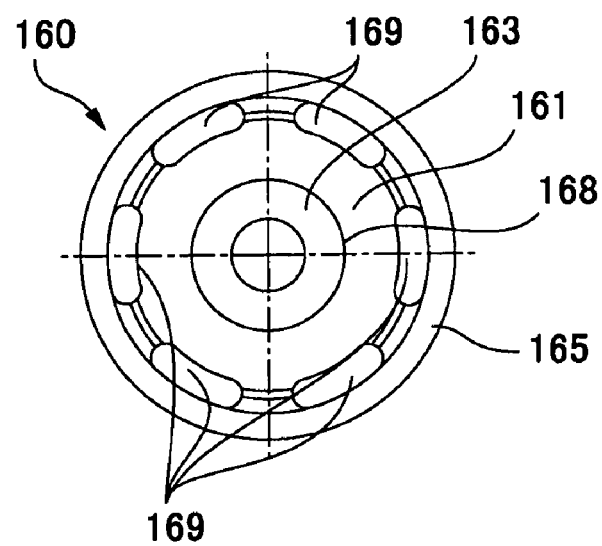
(c) 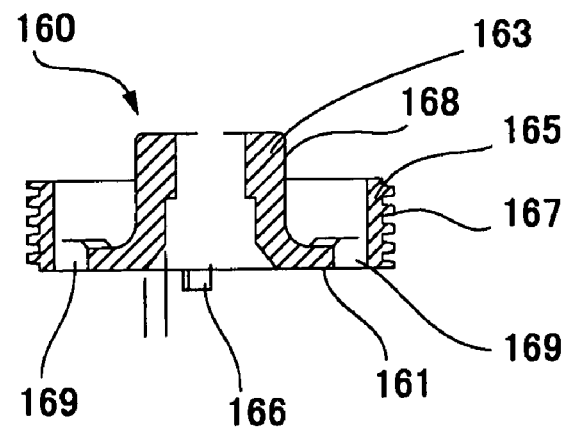

[Fig. 20]
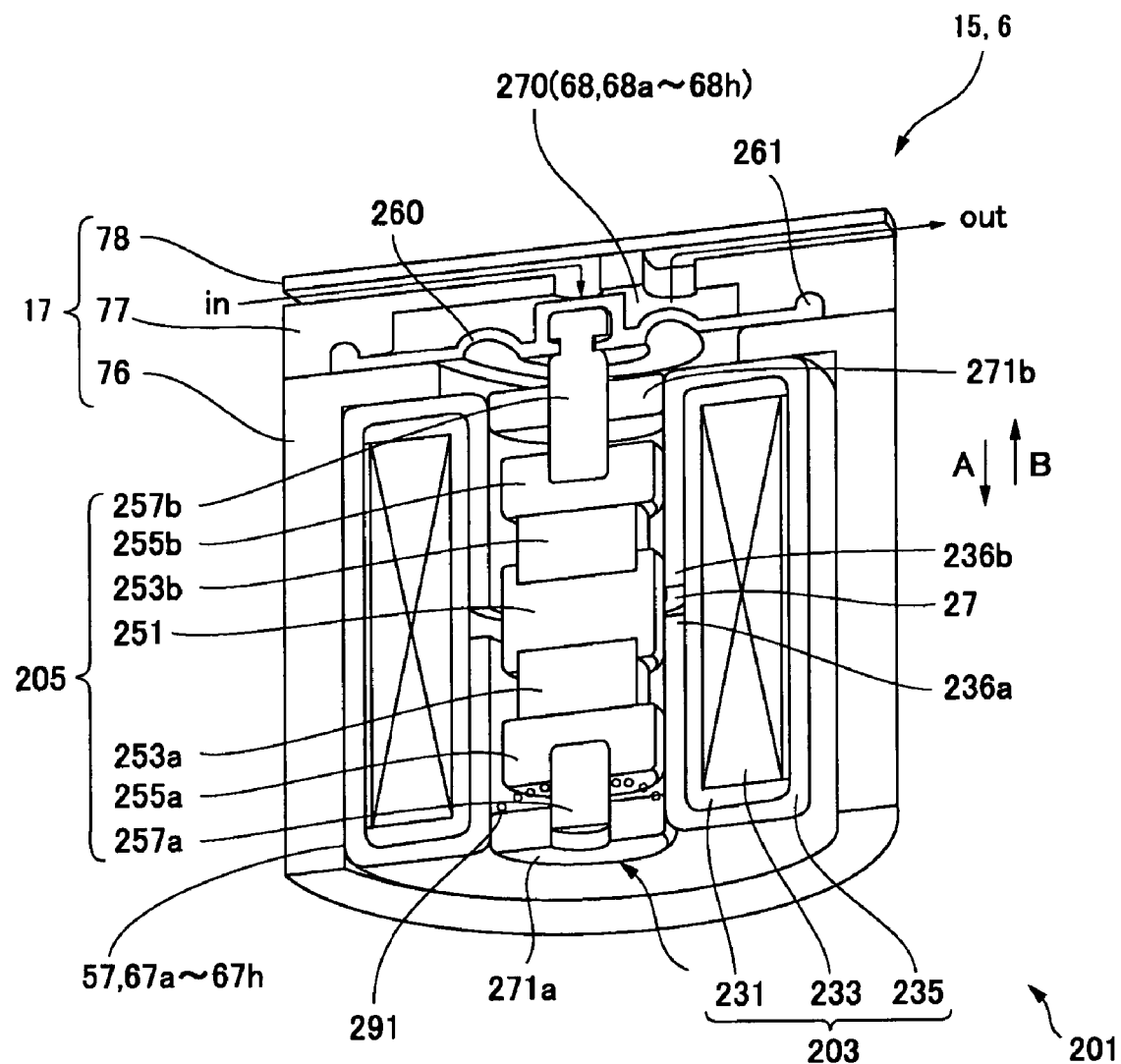

[Fig. 21]
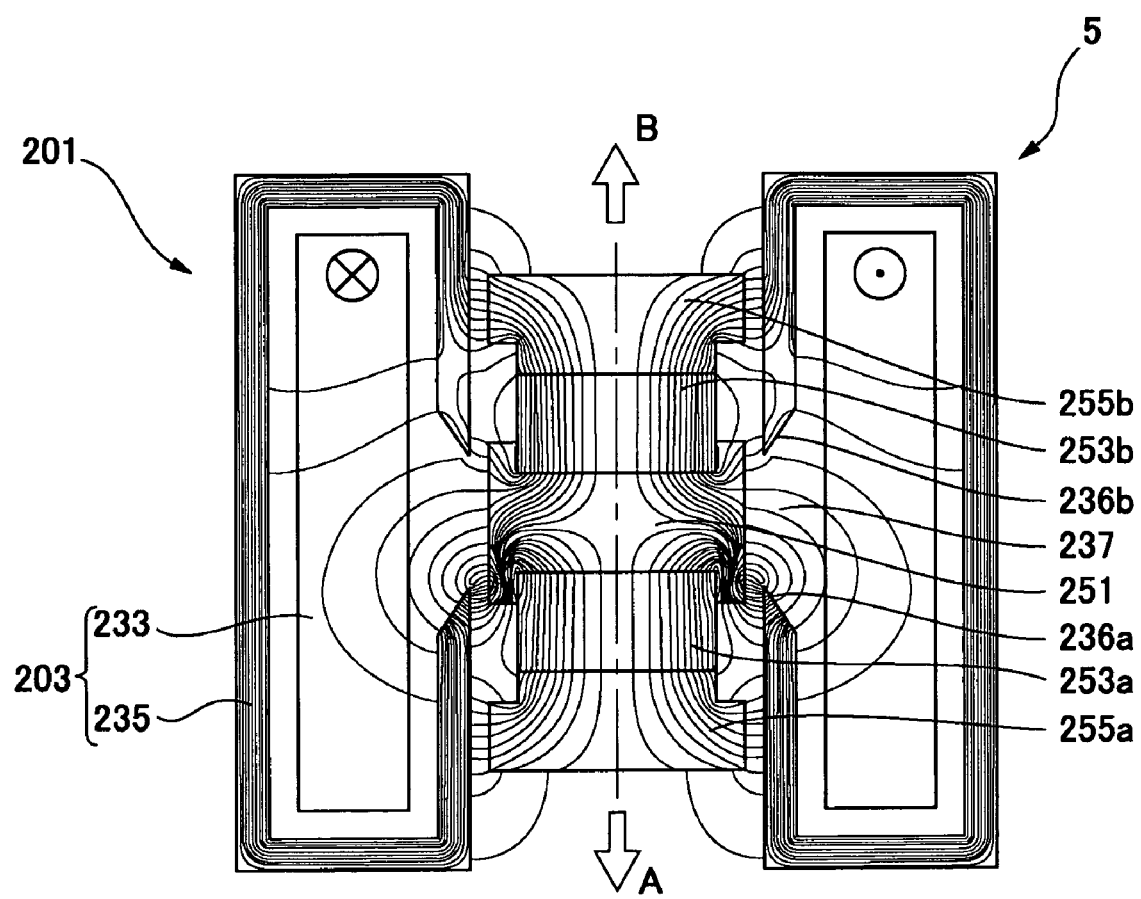

LINEAR ACTUATOR, AND VALVE DEVICE AND PUMP DEVICE USING THE SAME

CROSS REFERENCE TO RELATED APPLICATION

The present invention claims priority under 35 U.S.C. §119 to Japanese Application No. 2004-347701 filed Nov. 30, 2004, Japanese Application No. 2004-365924 filed Dec. 17, 2004, and Japanese Application No. 2005-43141 filed Feb. 18, 2005, each of which are incorporated herein by reference.

FIELD OF THE INVENTION

An embodiment of the present invention may relate to a linear actuator and a valve device using the linear actuator. Further, an embodiment of the present invention may relate to a pump device and, more specifically, a pump device in which an inflow port and a plurality of outflow ports are opened in a main body of the pump device.

BACKGROUND OF THE INVENTION

In a conventional linear actuator which is used in a valve device in a pump or the like, a solenoid is used without using a magnet. However, this type of linear actuator has a problem that when its size is made smaller, its thrust remarkably decreases as its volume decreases. Further, if only for a short time, the thrust can be increased by applying a large electric current to a coil but, when continuous operation is performed under the state that a large electric current is applied to the coil, excess heat generated may cause a problem.

In order to prevent such a problem, a linear actuator has been proposed in which a movable body provided with one piece of magnet is disposed in the inner side of a ring-shaped coil (see, for example, Japanese Patent Laid-Open No. 2002-206484).

In order to discharge liquid with a high degree of accuracy, a valve element is required to be reciprocated with a high degree of accuracy. Therefore, a cylinder pump has been proposed in which rotation of a motor is transmitted to a rotational cylinder through a deceleration gear train and the rotation of the rotational cylinder is converted to reciprocating motion of a movable body through a screw mechanism (see, for example, Japanese Patent Laid-Open No. Hei 10-184534).

On the other hand, expectation for a fuel cell has been elevated as a power supply for a portable electronic device used in information society in recent years or as a power supply for coping with air pollution or global warming. Among such fuel cells, a direct methanol type fuel cell (hereinafter, referred as DMFC: Direct Methanol Fuel Cell) in which power generation is performed by directly taking out protons from methanol provides characteristics that a reformer is not required and the volume energy density is high, and thus application to a portable electronic device has been increasingly expected.

Various DMFC's have been proposed which are provided with a power generating device having a power generating part (cell), an accommodating vessel for methanol or methanol aqueous solution (hereinafter, referred to as methanol), and a liquid feed pump for feeding methanol forcibly from the accommodating vessel (see, for example, Japanese Patent Laid-Open No. 2004-71262, Japanese Patent Laid-Open No. 2004-127618, and Japanese Patent Laid-Open No. 2004-152741).

The cell includes an anode electrode (fuel electrode) having an anode collector and an anode catalyst layer, a cathode electrode (air electrode) having a cathode collector and a cathode catalyst layer, and an electrolyte membrane disposed between the anode electrode and the cathode electrode. Methanol is supplied to the anode electrode with a liquid feed pump and air is supplied to the cathode electrode with an air supply pump or a blower.

A linear actuator with one piece of magnet has, for example, following problems. When one piece of magnet is magnetized in an axial direction, the utilization efficiency of magnetic flux is reduced further more as the magnet is downsized and thus a large thrust cannot be obtained. Further, when one piece of magnet is magnetized in a radial direction, since magnetic flux is radially generated and thus a relatively large thrust can be obtained but, in this case, the magnetizing in a radial direction is difficult. Especially, when the magnet is downsized, in the case that, for example, a magnet with the dimension of its outer diameter is small and the dimension in the axial direction is long, it is extremely difficult to magnetize the magnet in a radial direction and the magnetizing device itself may not be constructed and thus its mass production becomes difficult.

Further, downsizing is difficult in a pump device in which transmission is performed through a deceleration gear train. Further, a diaphragm valve is often used in a pump device. However, when a diaphragm valve is used, its deformation cannot be controlled accurately and thus it is difficult that a constant amount is discharged with a high degree of accuracy.

On the other hand, in the above-mentioned DMFC, activity of methanol oxidation is low in the anode electrode of a cell which is a power generating part of the DMFC and thus a voltage loss occurs. Further, a voltage loss occurs in the cathode electrode. Therefore, an output obtained from one cell becomes extremely low. Accordingly, a plurality of cell is used in the DMFC to obtain a prescribed output.

When methanol is excessively supplied to the anode electrode, a so-called crossover occurs in which a part of the methanol transmits through the electrolyte membrane in an unreacted state and leaks to the cathode electrode. Since the crossover causes the electric potential of the cathode electrode to become lower, the voltage loss is occurred in the cathode electrode. Further, unreacted methanol reached to the cathode electrode is not related to power generation and reacts with oxygen to generate heat, and thus the power-generating efficiency in a cell is significantly reduced by the crossover. Accordingly, it is preferable not to supply excessive methanol to the anode electrode.

As described above, for a pump device for supplying methanol to the anode electrode of a cell, a pump device has been desired which is provided with characteristics that discharge to a plurality of cell is possible and an appropriate amount of methanol can be accurately discharged. However, the pump device having such characteristics has not been proposed.

BRIEF DESCRIPTION OF THE INVENTION

In view of the problems described above, an embodiment may advantageously provide a linear actuator which is capable of obtaining a large thrust even when downsized and which is suitable for a mass production, and provide a valve device provided with this linear actuator.

Further, an embodiment may advantageously provide a small-sized pump device which is capable of performing a constant amount of discharge with a high degree of accuracy. Further, an embodiment may advantageously provide a small-sized pump device which is capable of performing a constant amount of discharge with a high degree of accuracy even when a diaphragm valve is used.

Further, an embodiment may advantageously provide a pump device which is provided with a plurality of outflow passages for discharging fluid and capable of accurately discharging an appropriate amount of fluid.

Thus, according to an embodiment, there may be provided a linear actuator including a fixed body which includes a coil that is wound around in a ring-shaped manner and a movable body. The movable body includes a first movable body side yoke which is disposed on the inner side or the outer side of the coil such that the peripheral face of the first movable body side yoke faces the peripheral face of the coil, and a pair of magnets which is laminated on both sides in an axial direction of the first movable body side yoke such that the same polarities of the magnets face the first movable body side yoke. The movable body is driven in the axial direction by energization to the coil.

In accordance with an embodiment, a pair of the magnets of the movable body are disposed such that their same polarities are faced to each other and magnetic repulsive forces are operated between them. However, since the first movable body side yoke is disposed between the magnets, a pair of the magnets can be fixed in the state where their same polarities are facing each other. Further, a pair of the magnets of the movable body are disposed such that their same polarities are faced to the first movable body side yoke. Therefore, strong magnetic flux is generated from the first movable body side yoke in the radial direction. Accordingly, when the peripheral faces of the first movable body side yoke and the coil are faced to each other, a large thrust can be generated in the movable body. In addition, since the magnets are magnetized in the axial direction, magnetizing is easy and suitable for mass production even when the magnets are miniaturized, which is different from the case where the magnets are magnetized in the radial direction.

In accordance with an embodiment, the fixed body is disposed in the inner side of the coil and the outer peripheral face of the first movable body side yoke faces the inner peripheral face of the coil. In this case, a closed magnetic path can be easily formed in comparison with the case that a magnet is disposed on the outer peripheral side of the coil. Further, when the magnet is disposed on the inner side of the coil, the magnet can be made smaller in comparison with the case that the magnet is disposed on the outer side of the coil, and thus a linear actuator can be constructed at a low cost.

In accordance with an embodiment, the fixed body includes a fixed body side yoke. The fixed body side yoke is formed such that one tip end part and the other tip end part of the fixed body side yoke are extended from the outer peripheral side of the coil to the inner peripheral side of the coil through both sides in the axial direction of the coil. The one tip end part and the other tip end part of the fixed body side yoke are disposed in a clearance between the outer peripheral face of the first movable body side yoke and the inner peripheral face of the coil, and the two tip end parts of the fixed body side yoke face each other in the axial direction through a slit, and a gap space is formed between the fixed body side yoke and the movable body. According to the construction described above, a closed magnetic path can be easily formed.

In accordance with an embodiment, the fixed body side yoke is provided with a coil wire lead-out part for drawing out the terminal of a coil wire of the coil.

In accordance with an embodiment, the tip end part of the fixed side yoke is formed such that the width of the slit on the movable body side is substantially the same or narrower than that of the slit on the coil side.

In accordance with an embodiment, a spacer made of non-magnetic material is disposed between the tip end parts of the fixed side yoke to connect the tip end parts to each other. In this case, the tip end parts can be prevented from being attracted and deformed by a magnet.

In accordance with an embodiment, the outer peripheral face of the first movable body side yoke is protruded on an outer peripheral side from the outer peripheral faces of a pair of the magnets. According to the construction described above, even when the fixed body side yoke is provided, magnetic attraction force applied to the movable body in the direction perpendicular to the axial direction can be reduced. Therefore, assembling operation is easily performed and the movable body is hard to be inclined.

In accordance with an embodiment, a second movable body side yoke is laminated on each of a pair of the magnets on an opposite side to the first movable body side yoke. Also in this case, the outer peripheral face of the second movable body side yoke is preferably protruded on the outer side from the outer peripheral face of a pair of the magnets. According to the construction described above, even when the fixed body side yoke is provided, magnetic attraction force applied to the movable body in the direction perpendicular to the axial direction can be reduced. Therefore, assembling operation is easily performed and the movable body is hard to be inclined.

In accordance with an embodiment, a support shaft is provided in the movable body so as to be extended at least in one direction in the axial direction and a bearing member is held in an opening part which opens in the axial direction in the fixed body for supporting the support shaft in a movable manner in the axial direction. According to the construction described above, another bearing member is not required to be disposed separately. Further, since the bearing members can be fixed with the fixed body as a reference, the support shaft is not inclined.

In accordance with an embodiment, a support shaft is provided in the movable body so as to be extended at least in one direction in the axial direction and a non-through hole or a through hole is formed in at least the first movable body side yoke and the magnet into which the support shaft is inserted. In this case, centering of the support shaft, the first movable body side yoke and the magnet can be easily performed.

In accordance with an embodiment, an urging member is disposed for urging the movable body at least in one axial direction.

The actuator in accordance with an embodiment may be used, for example, as a drive device for a valve device. In this case, a flow passage is opened and closed or the cross sectional area of the flow passage is increased and decreased by means of operations in the axial direction of the movable body to control the flow of fluid. Further, a valve element is preferably connected to the movable body for opening and closing the flow passage or increasing and decreasing the cross sectional area of the flow passage to control the flow of fluid. According to the construction described above, the valve element may be directly driven in a linear manner. In this case, the valve element is preferably disposed on both sides in the axial direction of the movable body. According to the construction described above, fluid can be discharged to two flow passages.

Further, according to an embodiment, there may be provided a pump device including a fixed body in which a pump chamber in communication with a fluid suction port and a fluid discharge port is constructed, a valve element for expanding and contracting an internal volume of the pump chamber to perform suction and discharge of fluid, and a drive mechanism for driving the valve element. The drive mechanism includes a ring-shaped stator including a coil, a rotation body including a rotor magnet whose peripheral face faces a peripheral face of the stator, a movable body to which the valve element is fixed, and a conversion mechanism in which rotation of the rotation body is converted into movement of the movable body in the axial direction. The conversion mechanism includes a power transmission mechanism which is provided with a screw groove or a cam groove between the rotation body and the movable body and a co-rotation preventive mechanism which prevents the movable body from co-rotating with the rotation body.

In the pump mechanism in accordance with an embodiment, the rotation of the rotation body is transmitted to the movable body through the conversion mechanism utilizing the power transmitting mechanism provided with screw groove or cam groove and thus the movable body to which the valve element is fixed is linearly moved in a reciprocal manner. Therefore, since power is transmitted with less members from the drive mechanism to the valve element, downsizing, thickness reduction and cost reduction of the pump device can be attained. Further, a constant amount of discharge can be performed with a high degree of accuracy by setting the lead angle of the power transmitting mechanism to be small.

In accordance with an embodiment, the rotation body is a cylindrical body which is coaxially disposed on the inner side of the stator and the movable body is coaxially disposed on the inner side of the rotation body.

In accordance with an embodiment, the valve element is a diaphragm valve which partitions the pump chamber, and the outer peripheral edge part of the diaphragm valve is fixed to the fixed body and the center part of the diaphragm valve is fixed to the movable body. The fixed body is provided with a second wall face which faces a first wall face of the movable body which is extended in the axial direction to form an annular space between the first wall face and the second wall face. Further, an annular portion between the central part and the outer peripheral edge part of the diaphragm valve is held in a state where the annular portion of the diaphragm valve is folded in a U-shape in cross section in the annular space. In this case, even when a diaphragm valve is used, its deformation can be controlled by the annular space. Therefore, even when the diaphragm valve is used, a constant amount of discharge can be performed with a high degree of accuracy.

In accordance with an embodiment, the movable body is provided with a flange part which is extended on an outer peripheral side and a plurality of holes is formed in a peripheral direction in the flange part. The second wall face is formed of a plurality of projections that is extended in the axial direction from a peripheral portion of the fixed body, and a plurality of the projections is fitted into a plurality of the holes to construct the co-rotation preventive mechanism. According to the construction described above, the co-rotation preventive mechanism can be constructed without adding another component.

In accordance with an embodiment, the rotation body is rotatably supported by a bearing ball around an axial line with respect to the fixed body.

In accordance with an embodiment, a stopper is provided for regulating the stop position of the rotation body.

Further, according to an embodiment, there may be provided a pump device including a main body of the pump device. The main body includes an inflow passage which is in communication with an inflow port, an inflow side active valve which is disposed in the inflow passage, a pump chamber which is connected to the inflow passage, a pump mechanism which is disposed in the pump chamber, a plurality of outflow passages which are extends from the pump chamber and are respectively in communication with a plurality of outflow ports, and outflow side active valves which are respectively disposed in a plurality of the outflow passages. Further, the inflow side active valve and the outflow side active valves are disposed in a plane manner around the pump chamber.

In accordance with an embodiment, the pump device is provided with a plurality of outflow passages connected to the pump chamber through the outflow side active valves. Therefore, the reverse flow of fluid can be securely prevented when the outflow side active valves are closed. Further, the discharge destinations of fluid that is discharged from the outflow passages can be controlled by the outflow side active valves. In addition, since fluid is discharged from the respective outflow passages by using one pump mechanism, discharging performance can be uniformed. Further, a plurality of the outflow side active valves are disposed around the pump chamber in a plane manner, and thus the flow passage of each of a plurality of the outflow passages can be shortened. Therefore, the variation of the discharge amount from the respective outflow passages can be reduced and an appropriate amount of fluid is discharged accurately. Further, although a plurality of outflow passages requires a plurality of the outflow side active valves, since a plurality of the outflow side active valves is disposed around the pump chamber in a plane manner, the flow passages of a plurality of the outflow passages can be shortened and thus the size of the pump device can be reduced.

In accordance with an embodiment, the lengths of flow passages from the pump chamber to the outflow side active valves are substantially equal to each other in a plurality of the outflow passages. According to the construction described above, the resistances of the flow passages become to be substantially equal to each other and thus the discharge amounts through the respective outflow passages can be controlled with a high degree of accuracy.

In accordance with an embodiment, the inflow port and a plurality of the outflow ports are provided on the same face of the main body of the pump device. In this case, the pump device can be easily connected to the outside.

In accordance with an embodiment, a wiring circuit board for the inflow side active valve, the pump mechanism and the outflow side active valves is overlapped on a face which is different from the face on which the inflow port and a plurality of the outflow ports are provided. According to the construction described above, when pipes are connected to the inflow port and the outflow ports, the wiring circuit board can be formed in a plane shape and thus wiring and connection can be easily performed.

In accordance with an embodiment, the main body of the pump device further includes a plate in which the outflow passages are formed in a shape of groove on one face side of the plate and a sheet shaped sealing member which is overlapped on the one face side of the plate. According to the construction described above, since complicated flow passages can be easily constructed, downsizing, thickness reduction and cost reduction of the pump device can be attained.

In accordance with an embodiment, the main body of the pump device further includes a case in which the pump mechanism is arranged, and the plate is overlapped on the case, and the pump mechanism is provided with a diaphragm valve. In this case, the outer peripheral portion of the diaphragm valve is preferably held between the case and the plate. According to the construction described above, structure can be simplified and liquid-tightness between the case and the plate can be attained by using the diaphragm valve itself.

In accordance with an embodiment, the main body of the pump device includes a case in which the inflow side active valve and the outflow side active valves are arranged, and the plate is overlapped on the case, and the inflow side active valve and the outflow side active valves are respectively provided with a diaphragm valve. In this case, the peripheral portions of all of the diaphragm valves are preferably held between the case and the plate. According to the construction described above, structure can be simplified and liquid-tightness between the case and the plate can be attained by using the diaphragm valve itself.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 1(a) is an explanatory perspective cross-sectional view showing an essential portion of a linear actuator in accordance with an embodiment which is cut in an axial direction and viewed from obliquely above, and FIG. 1(b) is an explanatory view showing the magnetic lines of force in the linear actuator.

FIGS. 2(a), 2(b) and 2(c) are explanatory perspective cross-sectional views showing modified embodiments of a fixed body in a linear actuator in accordance with an embodiment.

FIGS. 3(a), 3(b) and 3(c) are explanatory cross-sectional views showing modified embodiments of a movable body in a linear actuator in accordance with an embodiment.

FIG. 4 is an explanatory perspective view showing another modified embodiment of a movable body in a linear actuator in accordance with an embodiment.

FIGS. 5(a), 5(b) and 5(c) are explanatory views showing another modified embodiments of a movable body in a linear actuator in accordance with an embodiment.

FIGS. 6(a) and 6(b) are explanatory perspective cross-sectional views showing modified embodiments of a linear actuator in accordance with an embodiment in which an urging member is provided.

FIG. 7 is an explanatory perspective cross-sectional view showing another modified embodiment of a linear actuator in accordance with an embodiment in which another urging member is provided.

FIG. 8 is an explanatory perspective cross-sectional view showing a valve device in accordance with an embodiment in which a linear actuator is used as a drive device and which is cut in an axial direction and viewed from obliquely above.

FIG. 9 is an explanatory perspective cross-sectional view showing another valve device in accordance with an embodiment in which a linear actuator is used as a drive device and which is cut in an axial direction and viewed from obliquely above.

FIG. 10 is a schematic sectional view showing a basic construction of a pump device in accordance with an embodiment.

FIG. 11 is a timing chart showing a control method for a pump device shown in FIG. 10.

FIG. 12(a) is a perspective view showing a pump device in accordance with an embodiment and FIG. 12(b) is an explanatory plan view showing flow passages and the like.

FIG. 13 is an exploded perspective view showing a pump device in accordance with an embodiment which is viewed from obliquely above.

FIG. 14 is an exploded perspective view showing a pump device in accordance with an embodiment which is viewed from obliquely below.

FIG. 15 is an explanatory cross-sectional view showing a construction of a pump device in accordance with an embodiment.

FIG. 16 is an exploded perspective view showing a state where a pump device in accordance with an embodiment is longitudinally divided.

FIG. 17(a) is an explanatory perspective cross-sectional view showing a state where the internal volume of a pump chamber is expanded in the pump device shown in FIG. 16, and FIG. 17(b) is an explanatory perspective cross-sectional view showing a state where the internal volume of the pump chamber is contracted.

FIG. 18(a) is a perspective view showing a rotor used in a rotation body in a pump mechanism shown in FIG. 16, FIG. 18(b) is its plan view, and FIG. 18(c) is its cross-sectional view.

FIG. 19(a) is a perspective view showing a movable body used in the rotation body of the pump mechanism shown in FIG. 16, FIG. 19(b) is its plan view and FIG. 19(c) is its sectional view.

FIG. 20 is an explanatory perspective cross-sectional view showing an essential portion of a valve used as an active valve in a pump device in accordance with an embodiment which is cut in an axial direction and viewed from obliquely above.

FIG. 21 is an explanatory view showing the magnetic lines of force in the valve shown in FIG. 20.

DETAILED DESCRIPTION OF THE PREFERRED EMBODIMENTS

A linear actuator in accordance with an embodiment will be described below with reference to the accompanying drawings.

FIG. 1(a) is an explanatory perspective cross-sectional view showing a portion of a linear actuator to which the present invention may be applied, which is cut in an axial direction and viewed from obliquely above. FIG. 1(b) is an explanatory view showing the magnetic lines of force in the linear actuator.

In FIGS. 1(a) and 1(b), a linear actuator 1 in accordance with an embodiment is used in a valve device or a compressor device for supplying various fluids. The linear actuator 1 includes a cylindrical fixed body 3 and a roughly cylindrical movable body 5 which is disposed in the inner side of the fixed body 3. The fixed body 3 includes a coil 33 wound around a bobbin 31 in a ring-shaped manner and a fixed body side yoke 35 which is formed such that one front end part 36a and the other front end part 36b face each other in an axial direction via a slit 37 on the inner side of the coil 33 through both sides in the axial direction of the coil 33 from the outer peripheral side of the coil 33. The movable body 5 includes a first movable body side yoke 51 in a circular disk shape and a pair of magnets 53a, 53b which are laminated on both sides in the axial direction of the first movable body side yoke 51. Rare earth magnet of Nd—Fe—B system or Sm—Co system, or resin magnet may be used as a pair of the magnets 53a, 53b. In the movable body 5, second movable body side yokes 55a, 55b are laminated on the end faces of a pair of the respective magnets 53a, 53b opposite to the first movable body side yoke 51.

In accordance with an embodiment, each of the magnets 53a, 53b is magnetized in the axial direction and same polarities are positioned on the first movable body side yoke 51. In this embodiment, a pair of the magnets 53a, 53b are disposed such that their N-poles are positioned on the first movable body side yoke 51 and their S-poles are positioned on the opposite side in the axial direction. However, the magnetized direction may be reversed.

The outer peripheral face of the first movable body side yoke 51 is protruded on the outer side from the outer peripheral face of the magnets 53a, 53b. Further, the outer peripheral faces of the second movable body side yokes 55a, 55b are protruded on the outer side from the outer peripheral faces of the magnets 53a, 53b.

Recessed parts are formed on both end faces in the axial direction of the first movable body side yoke 51 and a pair of the magnets 53a, 53b are fitted to the respective recessed parts and fixed with an adhesive or the like. The first movable body side yoke 51, a pair of the magnets 53a, 53b and the second movable body side yokes 55a, 55b may be fixed by adhesion, press fitting or both.

Bearing plates 71a, 71b (bearing member) are fixed in the aperture parts on both sides in the axial direction of the fixed body 3. Support shafts 57a, 57b which are protruded on both sides in the axial direction from the second movable body side yokes 55a, 55b are slidably inserted into the holes of the bearing plates 71a, 71b. In this manner, the movable body 5 is supported by the fixed body 3 in the state that the movable body 5 is movable up and down in the axial direction. In this state, the outer peripheral face of the movable body 5 faces the inner peripheral surface of the fixed body 3 through a prescribed gap space and the front end parts 36a, 36b of the fixed body side yoke 35 face each other in the axial direction in a gap space formed between the outer peripheral face of the fist movable body side yoke 51 and the inner peripheral surface of the coil 33. Further, a clearance is formed between the movable body 5 and the fixed body side yoke 35. The second movable body side yokes 55a, 55b and the support shafts 57a, 57b are fixed to each other by adhesion, press fitting or both of them.

In the linear actuator 1 constructed as described above, when an electric current is supplied to the coil 33 so as to flow toward the near side from the far side in the left side in the drawing and, in the right side in the drawing, from the near side toward the far side, the magnetic lines of force are expressed as shown in FIG. 1(b). Therefore, the movable body 5 receives an upward thrust in the axial direction due to the Lorentz force and moves up as shown by the arrow "U". On the contrary, when energizing direction to the coil 33 is reversed, the movable body 5 moves down along the axial direction as shown by the arrow "D". Accordingly, when an alternating current is applied to the coil 33, the movable body 5 is linearly moved back and forth in the axial direction.

As described above, in this embodiment, a pair of the magnets 53a, 53b of the movable body 5 are disposed such that their same polarities are faced to each other and magnetic repulsive forces are operated between them. However, since the first movable body side yoke 51 is disposed between the magnets 53a, 53b, a pair of the magnets 53a, 53b can be fixed in the state where their same polarities are faced to each other.

Further, a pair of the magnets 53a, 53b of the movable body 5 are disposed such that their same polarities are faced to the first movable body side yoke 51. Therefore, strong magnetic flux is generated from the first movable body side yoke 51 in the radial direction. Accordingly, when the peripheral faces of the first movable body side yoke 51 and the coil 33 are faced to each other, a large thrust can be applied to the movable body 5.

In addition, since the magnets 53a, 53b are magnetized in the axial direction, magnetizing is easy and suitable for mass production even when the magnets are miniaturized, which is different from the case where the magnets 53a, 53b are magnetized in the radial direction.

Moreover, in this embodiment, the outer peripheral face of the first movable body side yoke 51 is protruded on the outer side from the outer peripheral faces of a pair of the magnets 53a, 53b. Therefore, even when the fixed body side yoke 35 is provided, magnetic attraction force applied to the movable body 5 in the direction perpendicular to the axial direction can be reduced. Similarly, the outer peripheral faces of the second movable body side yokes 55a, 55b are protruded on the outer side from the outer peripheral faces of a pair of the magnets 53a, 53b. Therefore, even when the fixed body side yoke 35 is provided, magnetic attraction force applied to the movable body 5 in the direction perpendicular to the axial direction can be reduced. Accordingly, assembling operation is easily performed and the movable body 5 is hard to be inclined.

Further, in this embodiment, the magnets 53a, 53b are disposed on the inner side of the coil 33. Therefore, in comparison with the case where the magnets 53a, 53b are disposed on the outer side of the coil 33, the magnets 53a, 53b can be made smaller and thus the linear actuator 1 can be constructed at a low cost. Further, since the coil 33 is disposed on the outer side, magnetic path can be closed only with the fixed side yoke.

In addition, the bearing plates 71a, 71b which movably support the support shafts 57a, 57b in the axial direction are held in the aperture parts opened in the axial direction of the fixed body 3. Therefore, other bearing members are not required to be disposed separately. Further, since the bearing plates 71a, 71b can be fixed with the fixed body 3 as a reference, the support shafts 57a, 57b may not be inclined.

Modified embodiments described below are common to the above-mentioned embodiment in the basic structure. Therefore, the same notational symbols are used in the common portions in the drawings and their descriptions are omitted.

FIGS. 2(a), 2(b) and 2(c) are explanatory perspective cross-sectional views showing modified embodiments of the fixed body 3 in a linear actuator to which the present invention is applied.

In the linear actuator 1 shown in FIGS. 1(a) and 1(b), the position where the front end parts 36a, 36b of the fixed body side yoke 35 face each other is substantially center in the axial direction. However, as shown in FIG. 2(a), the position of the slit 37 where the front end parts 36a, 36b face each other may be shifted on one side from the center position in the axial direction, for example, on a lower side. According to this construction, the up-speed and the down-speed of the movable body 5 can be made different from each other. Accordingly, in the valve device described below, the speed when fluid is introduced into a pump chamber can be made different from the speed when the fluid is discharged from the pump chamber. Further, with regard to the shape of the front end parts 36a, 36b of the fixed body side yoke 35, taper may be formed on the front end face from the outer peripheral side to the inner peripheral side such that the front end parts 36a, 36b are closed to each other on the inner peripheral side (near side of the movable body 5). According to the construction described above, the width of the slit 37 on the movable body 5 side in the front end parts 36a, 36b of the fixed side yoke can be narrower than that of the slit 37 on the coil 33 side.

As shown in FIG. 2(b), the fixed body side yoke 35 of the linear actuator 1 may be constructed by two yoke members arranged in the axial direction. In this case, the fixed body 3 can be assembled such that the bobbin 31 around which the coil 33 is wound is sandwiched by two yoke members from both sides in the axial direction and thus efficiency of assembling operation can be enhanced. Further, with regard to the shape of the front end parts 36a, 36b of the fixed body side yoke 35 in the linear actuator 1, stepped parts may be formed so as to protrude on the inner peripheral side in the axial direction such that the front end parts 36a, 36b are closed to each other on the inner peripheral side (near side of the movable body 5). According to the construction described above, the width of the slit 37 on the movable body 5 side in the front end parts 36a, 36b of the fixed side yoke can be narrower than that of the slit 37 on the coil 33 side.

As shown in FIG. 2(c), in the shape of the front end parts 36a, 36b of the fixed body side yoke 35 in the linear actuator 1, a taper may be formed on the front end face from the outer peripheral side to the inner peripheral side and ring-shaped grooves 361a, 361b may be formed in the midway position of the taper such that the front end parts 36a, 36b are closed to each other on the inner peripheral side (near side of the movable body 5). Further, when a spacer made of nonmagnetic material is fitted between the front end parts 36a, 36b so as to be engaged with the ring-shaped grooves 361a, 361b, the front end parts 36a, 36b can be connected to each other. As a result, the front end parts 36a, 36b can be prevented from being deformed by attraction of the magnets 53a, 53b.

FIGS. 3(a), 3(b), 3(c), FIG. 4, and FIGS. 5(a), 5(b), 5(c) are explanatory views showing modified embodiments of the movable body 5 in the linear actuator 5 to which the present invention is applied.

In the linear actuator 1 shown in FIGS. 1(a) and 1(b), the recessed parts to which the magnets 53a, 53b are fitted are formed on the both end faces in the axial direction of the first movable body side yoke 51. However, as shown in FIG. 3(a), it may be constructed that both end faces in the axial direction of the fist movable body side yoke 51 are formed to be flat and the magnets 53a, 53b are fixed to the flat faces with an adhesive or the like.

Alternatively, as shown in FIG. 3(b), it may be constructed that the fist movable body side yoke 51, a pair of the magnets 53a, 53b and the second movable body side yokes 55a, 55b are fixed to each other with an adhesive 59 or the like in a separated manner in the axial direction.

Alternatively, as shown in FIG. 3(c), it may be constructed that through holes with specified sizes are formed at the respective enters of the first movable body side yoke 51, a pair of the magnets 53a, 53b and the second movable body side yokes 55a, 55b, and a support shaft 57 with step portions are fitted to the through holes. The through holes are formed to be smaller in the order of the fist movable body side yoke 51, a pair of the magnets 53a, 53b, and the second movable body side yokes 55a, 55b, and the diameters of the support shaft 57 are set to be thinner toward both shaft end sides from its center portion. According to the construction described above, when the first movable body side yoke 51, a pair of the magnets 53a, 53b and the second movable body side yokes 55a, 55b are successively fitted from the both shaft end sides of the support shaft 57 with step portions, the respective positions can be easily determined and the respective centerings of the first movable body side yoke 51, a pair of the magnets 53a, 53b and the second movable body side yokes 55a, 55b can be performed effectively.

The shape of the support shaft 57 is not limited to a round bar and, as shown in FIG. 4, the support shaft 57 formed of a square bar such as a hexagonal bar may be used. In this case, through holes having a shape corresponding to the support shafts 57a, 57b are formed in the first movable body side yoke 51, a pair of the magnets 53a, 53b and the second movable body side yokes 55a, 55b. Further, bearing holes having a shape corresponding to the support shafts 57a, 57b may be formed in the bearing plates 71a, 71b for supporting the support shaft 57. According to the construction described above, rotation of the movable body 5 around the axial line can be prevented.

Alternatively, it may be constructed that through holes are formed in a pair of the magnets 53a, 53b and the second movable body side yokes 55a, 55b, and non-through holes are formed in the first movable body side yoke 51, and support shafts are inserted from both sides in the axial direction.

In either of the embodiments described above, all of the first movable body side yoke 51, a pair of the magnets 53a, 53b and the second movable body side yokes 55a, 55b are formed in a circular cylindrical shape. However, for example, as shown in FIG. 5(a), the first movable body side yoke 51, a pair of the magnets 53a, 53b and the second movable body side yokes 55a, 55b may be formed in a square rod shape such as a hexagonal cylinder.

Further, for example, as shown in FIGS. 5(b) and 5(c), the shape of the second movable body side yokes 55a, 55b is not circular cylindrical but its end face may be formed in a curved shape and its planar shape may be elliptical, elongated circular or irregular shape which is deviated and extended on one side.

FIGS. 6(a), 6(b) and FIG. 7 are explanatory perspective cross-sectional views showing modified embodiments of the linear actuator 1 to which the present invention is applied.

In the linear actuator 1 shown in FIGS. 1(a) and 1(b), the movable body 5 is moved only by magnetic force. However, for example, as shown in FIG. 6(a), it may be constructed that a coiled spring 91 in a truncated cone shape is disposed as an urging member on one side in the axial direction between the bearing plate 71a, 71b and the second movable body side yokes 55a, 55b. In this case, for example, when the movable body 5 moves down, the movable body 5 moves at a low speed while deforming the compression spring and, when the movable body 5 moves up, the movable body 5 moves at a high speed with the aid of returning force of the shape of the compression spring.

Further, as shown in FIG. 6(b), coiled springs 91, 92 as an urging member may be disposed on both sides in the axial direction between the bearing plates 71a, 71b and the second movable body side yokes 55a, 55b such that urging forces may be applied so that the movable body 5 is always to be held at a center position (home position) in the axial direction.

In order to urge the movable body 5 in the axial direction, a gimbal spring 93 as shown in FIG. 7, a flat plate spring, or a volute spring may be disposed instead of the coiled springs 91, 92 as shown in FIGS. 6(a) and 6(b).

Further, as shown in FIG. 6(b) and FIG. 7, at least a coil wire lead-out hole 350 for drawing out the terminal of a coil wire from the coil 33 is preferably formed in the fixed body side yoke 35, for example, at its end part located in the axial direction and a tube part 310 of the bobbin 31 is disposed in the coil lead-out hole 350. According to the construction described above, the terminal of a coil wire can be drawn out easily.

In the embodiment described above, the movable body 5 is disposed in the inner side of the fixed body 3. However, it may be the constructed that a fixed body provided with a coil wound in a ring-shaped manner is disposed in the inner side of a ring-shaped movable body. In this case, the linear actuator is similarly constructed to the embodiment described above except that the outer peripheral face of the coil faces the inner peripheral face of the movable body.

The linear actuator 1 in accordance with an embodiment may be used as a drive device for a valve device 100 as described below with reference to FIGS. 8 and 9. The basic construction of the linear actuator 1 used in the valve device 100 described below is similar to the embodiment shown in FIGS. 1(a) and 1(b) and thus the same notational symbols are used in the same portions.

Each of FIG. 8 and FIG. 9 is an explanatory view showing a valve device 100 in which the linear actuator 1 is used as its drive device and which is cut in an axial direction and viewed from obliquely above.

In the valve device 100 shown in FIG. 8, the linear actuator 1 to which the present invention is applied is used in a state that the linear actuator 1 is surrounded by a cylindrical housing 110. A pump chamber 170, which is provided with flow passages where fluid flows in the direction shown by the arrow "Lin" and the arrow "Lout", is formed by using a passage constructing member 130 under the cylindrical housing 110.

As described in FIGS. 1(a) and 1(b), the movable body 5 in the linear actuator 1 is reciprocated in the axial direction by controlling the energization to the coil 33. The lower end part of one of the support shafts 57a, 57b is connected to the center portion of a diaphragm valve 150. A ring-shaped thick wall part 151 functioning as an O-ring is formed on the outer peripheral side of the diaphragm valve 150. In the diaphragm valve 150, liquid-tightness is ensured by means of that the outer peripheral side including the ring-shaped thick wall part 151 is sandwiched between the housing 110 and the flow passage constructing member 130. Check valves (not shown) are disposed on inflow side and outflow side of the flow passages. The inflow side is generally maintained in a higher pressure state to the outflow side by a pressure generation means which is prepared separately (not shown). Substantially sealed liquid-tightness is attained by the bottom part of the diaphragm valve 150 which substantially contacts with the opening part on the inflow side of the flow passage in a liquid tight manner. When operation of the diaphragm valve 150 in the direction as shown by the arrow "U" is performed, the opening part on the inflow side of the flow passage is opened to flow liquid promptly on the outflow side. On the contrary, the operation of the diaphragm valve 150 in the direction as shown by the arrow "D" closes the opening part on the inflow side of the flow passage or overcomes a pressure from the inflow side which is going to open and promptly stops the flow of the liquid to the outflow side. These operations can be effectively assisted by appropriately using an urging spring. In this case, since the diaphragm valve 150 is directly connected to one of the support shafts 57a, 57b, the diaphragm valve 150 is directly driven in a linear manner.

The valve element is not limited to the diaphragm valve 150 and a bellows valve and other types of a valve element may be used. The support shafts 57a, 57b and the valve elements may be connected to each other. Alternatively, the support shafts 57a, 57b and valve elements which are integrally formed may be used.

The basic construction of a valve device 100 shown in FIG. 9 is similar to the valve device 100 described in FIG. 8 and therefore, the description of the housing 110 and the flow passage constructing member 130 and the like is omitted. In the valve device 100 shown in FIG. 9, the support shafts 57a, 57b on both sides in the linear actuator 1 are respectively fixed to the diaphragm valves 150. Therefore, when the movable body 5 is moved in the direction as shown by the arrow "U" or the direction as shown by the arrow "D", two diaphragm valves 150 are respectively deformed in reverse directions. Accordingly, in two upper and lower pump chambers 170, the above-mentioned operations (liquid suction and discharge) are performed exclusively.

The valve device 100 may be constructed such that expansion and contraction are performed at the same time in two upper and lower pump chambers 170.

In FIGS. 8 and 9, the linear actuator 1 in accordance with an embodiment is used in the valve device 100. However, the linear actuator 1 in accordance with an embodiment may be used in an air valve device 100 and various valve devices for dynamic pressure control in addition to a valve device 100 for liquid feeding. Further, the linear actuator 1 itself may be used as a small linear propelling device.

Next, FIG. 10 is a schematic sectional view showing a basic construction of a pump device to which the present invention is applied. As shown in FIG. 10, a pump device 10 in accordance with an embodiment is used as a liquid feed pump for feeding methanol forcibly in a DMFC which is used, for example, in a portable electronic device. One inflow port 80 and a plurality of outflow ports 40 (40a through 40h) are opened in the main body 17 of the pump device. The main body 17 of the pump device is provided with a pump chamber 2, an inflow passage 13 which is connected to the pump chamber 2 and an inflow port 80, and a plurality of outflow passages 4 (40a through 40h) which is connected to the pump chamber 2 and a plurality of outflow ports 40. Further, an inflow side active valve 15 is constructed in the inflow passage 13 of the main body 17 of the pump device and a pump mechanism 113 is constructed in the pump chamber 2, and outflow side active valves 6 (6a through 6h) are constructed in each of a plurality of the outflow passages 4. Eight outflow ports 40a through 40h and eight outflow passages 4a through 4h are capable of being connected to eight cells (not shown in the drawing) which are respectively power generating parts of the DMFC. Methanol discharged from the outflow passages 4a through 4h are capable of being supplied to the anode electrode of a cell.

A first flow passage 8 provided with a passive valve 110 which opens in an inflow direction to the pump chamber 2 is connected to the inflow passage 13 and a second flow passage 9 provided with a passive valve 111 which opens in an outflow direction from the pump chamber 2 is also connected to the inflow passage 13. An inflow port 80 is constructed with an end part of the first flow passage 8 and a return flow port 90 is constructed with an end part of the second flow passage 9. The first flow passage 8 and the second flow passage 9 are capable of being connected to a methanol accommodating vessel (hereinafter, accommodating vessel; not shown in the drawing). Specifically, the first flow passage 8 is connectable on the lower side of the accommodating vessel and the second flow passage 9 is connectable on the upper side of the accommodating vessel. The passive valve 110 is a valve which is, for example, made of rubber. The passive valve 110 opens when a pressure is applied in a suction direction of methanol directing to the pump chamber 2 but does not open even when a pressure is applied in a discharge direction of methanol directing to the accommodating vessel. Therefore, methanol is sucked to the pump chamber 2 from the accommodating vessel through the inflow port 80, the first flow passage 8 and the inflow passage 13 and discharged from the pump chamber 2 to the accommodating vessel through the inflow passage 13, the second flow passage 9 and the return flow port 90.

In the pump device 10 constructed as described above, the inflow side active valve 15 are capable of being opened or closed by a drive actuator described below (not shown in FIG. 10). Further, similarly to the inflow side active valve 15, the outflow side active valves 6a through 6h are capable of being individually opened or closed by a drive actuator described below (not shown in FIG. 10).

In the pump device 10 constructed as described above, when the outflow side active valves 6a through 6h are in a closed state and the inflow side active valve 15 is in an open state, and further when the pump mechanism 113 expands the pump chamber 2, methanol is sucked into the pump chamber 2. On the other hand, when the inflow side active valve 15 is in a closed state and at least one of the outflow side active valves 6a through 6h is in an open state, and further when the pump mechanism 113 makes the pump chamber 2 contract, the methanol is discharged to a cell from the pump chamber 2. Further, when the outflow side active valves 6a through 6h are in a closed state and the inflow side active valves 15 is in an open state and, in this state, when the pump mechanism 113 makes the pump chamber 2 contract, the methanol is discharged to the accommodating vessel.

FIG. 11 is a timing chart showing a control method for a pump device shown in FIG. 10. The pump device 10 in accordance with an embodiment is, as shown in FIG. 11, controlled by a control method including a suction step "S1" in which the inflow side active valve 15 is opened and methanol is sucked into the pump chamber 2 through the first flow passage 8 by a suction operation of the pump mechanism 113, an initial discharge step "S2" after the suction step "S1" in which the backlash of the pump device 10 is eliminated by means of that methanol is discharged from the pump chamber 2 to the second flow passage 9 due to the discharge operation of the pump mechanism 113 and then the inflow side active valve 15 is closed, and a discharge step "S3" after the initial discharge step "S2" in which a prescribed outflow side active valve 6 is successively opened and a prescribed amount of methanol is discharged by the discharge operation of the pump mechanism 113. The control method will be described in detail below.

In the chart shown in the upper part of FIG. 11, the portions on the under side of the center horizontal line indicate states of a discharge operation in which the pump mechanism 113 is operated in the discharge direction. The portion on the upper side of the center horizontal line indicates the state of a suction operation in which the pump mechanism 113 is operated in the suction direction. Further, in the timing chart of an actuator in the active valves 15, 6 shown in the lower part of FIG. 11, the portions on the upper side indicate states in which the respective active valves 15, 6 are opened.

In the initial state, all of the inflow side active valve 15 and the outflow side active valve 6 are in the closed state. First in this state, the inflow side active valve 15 is set to be in an open state. Thereafter, the pump mechanism 113 is operated in the discharge direction of methanol. The discharge operation by the pump mechanism 113 is performed to the top dead point (home position) and the origin-reset of the pump mechanism 113 is performed (origin-reset step "S0"). In this case, methanol is discharged to the second flow passage 9 from the pump chamber 2 through the passive valve 111 which is capable of being in an open state.

Next, methanol is sucked into the pump chamber 2 (suction step "S1"). Specifically, under the open state of the inflow side active valve 15, the pump mechanism 113 is driven in the suction direction of methanol. The suction operation of the pump mechanism 113 is performed, for example, to the bottom dead center of the pump mechanism 113. Methanol is sucked into the pump chamber 2 from the first flow passage 8 through the passive valve 110 which is capable of being in an open state by the suction operation of the pump mechanism 113.

Next, after the backlash of the pump device 10 is eliminated by means of that methanol is discharged from the pump chamber 2 by the discharge operation of the pump mechanism 113, the inflow side active valve 15 is closed (initial discharge step "S2"). More specifically, under the open state of the inflow side active valve 15, the pump mechanism 113 is moved in the discharge direction of methanol until the backlash of the pump device 10 is eliminated. Methanol is discharged to the second flow passage 9 by the discharge operation of the pump mechanism 113 through the passive valve 111 which becomes to be in an open state, and then the inflow side active valve 15 is closed.

Next, a prescribed outflow side active valve 6 is successively opened and a predetermined amount of methanol is discharged by the discharge operation of the pump mechanism 113 (discharge step "S3"). More specifically, first, the outflow side active valve 6f is set to be in an open state, and the discharge operation is performed by the pump mechanism 113 to discharge a predetermined amount of methanol from the outflow passage 4f. Next, after the outflow side active valve 6f is set to be in a closed state and the outflow side active valve 6g is set to be in an open state, the discharge operation of the pump mechanism 113 is performed to discharge a predetermined amount of methanol from the outflow passage 4g. In this manner, while the opening/closing operations of the outflow side active valves 6f, 6g, 6h, 6a, 6b, 6c, 6d, 6e are successively performed in this order, when the discharge operation of the pump mechanism 113 is performed, a prescribed amount of methanol is discharged from the outflow passages 4f, 4g, 4h, 4a, 4b, 4c, 4d, 4e in this order.

In the case that a detector for detecting air bubbles is provided in the pump chamber 2, when the detector detects air bubbles, the discharge operation of the pump mechanism 113 is performed, for example, under the state that the inflow side active valve 15 is set to be in an open state, the air bubbles can be discharged to the second flow passage 9 through the passive valve 111 which is capable of being in an open state. Further, at the starting time of the pump device 10 or after the exchange of the accommodating vessel, air bubbles can be discharged by performing similar operations.

As described above, the pump device 10 in accordance with this embodiment is provided with the outflow side active valves 6a through 6h. Therefore, the reverse flow of methanol from the outflow passages 4a through 4h to the pump chamber 2 can be securely prevented. Further, the discharge destinations of methanol which is discharged from the outflow passages 4a through 4h can be controlled by the outflow side active valves 6a through 6h. In addition, in the pump device 10, methanol is discharged from the respective outflow passages 4a through 4h by the discharge operation of one pump mechanism 113. Therefore, discharging performance becomes uniform in comparison with the case when pump mechanisms are provided for the respective outflow passages 4a through 4h and thus the variation of discharge amount from the respective outflow passages 4a through 4h can be restrained. Accordingly, an appropriate amount of methanol can be accurately discharged in the pump device 10.

Further, the inflow passage 13 is connected to the pump chamber 2 through the inflow side active valve 15. Therefore, the reverse flow from the pump chamber 2 to the inflow passage 13 can be securely prevented.

In the control method for the pump device 10 in this embodiment, the initial discharge step "S2" for eliminating the backlash of the pump device 10 is provided between the suction step "S1" and the discharge step "S3". Therefore, in the discharge step "S3", the relationship between the moving quantity of the pump mechanism and the discharge amounts from the outflow passages 4a through 4h can be maintained in a linear manner from the beginning. Accordingly, when the moving quantity of the pump mechanism is appropriately controlled, the discharge amount from the outflow passage 4f where fluid is firstly discharged in the discharge step "S3" can be also accurately controlled and thus the variation of the discharge amounts from the respective outflow passages 4a through 4h can be reduced.

In addition, methanol is sucked in the suction step "S1" which is required to discharge from the outflow passages 4a through 4h by a plurality of times in the discharge step "S3". Therefore, even when the discharge amount of methanol which is discharged from the respective outflow passages 4a through 4h is a significantly small amount, the suction amount can be ensured to some extent. For example, even when each of the discharge amounts from the respective outflow passages 4a through 4h is 1 (μl), the suction amount can be totally 8 (μl). Accordingly, the capacity of the pump device 10 can be increased and the self-feeding performance can be easily attained.

FIG. 12(a) is a perspective view showing a pump device in accordance with an embodiment and FIG. 12(b) is an explanatory plan view showing flow passages and the like. FIGS. 13 and 14 are exploded perspective views showing a pump device in accordance with an embodiment which is viewed from obliquely above and which is viewed from obliquely below. FIG. 15 is an explanatory perspective cross-sectional view showing a construction of a pump device to which the present invention is applied.

As shown in FIGS. 12(a) and 12(b), pipes constructing the inflow port 80, the return flow port 90, the outflow ports 40 described in FIG. 10 are connected to one face 171 of a box-shaped main body 17 of the pump device 10 in accordance with this embodiment.

In order to construct the pump device 10 as described above, in this embodiment, the main body 17 of the pump device is constructed such that a wiring circuit board 74 for the pump mechanism 113 and active valves 15, 6, a base 75, a case 76, a plate 77 in which flow passages described below are formed in a groove shape, a liquid-tight sheet 78 which closes the upper faces of the flow passages by covering the upper face of the plate 77, and a cover 79 to which the pipes are coupled are laminated in this order.

As shown in FIGS. 13 and 14, openings 137, 57, 67a through 67h for constructing disposing space for the pump mechanism 113 and the active valves 15, 6 are formed in the case 76. Further, a circular through hole 21 for constructing the pump chamber 2 is formed at the center position of the plate 77. Recessed parts 58, 68a through 68h for constructing valve chambers of the active valves 15, 6 are formed around the through hole 21 on the under face of the plate 77.

Further, nine grooves 131, 41a through 41h are radially extended from the through hole 21. Also, grooves 82, 92, 42a, 42b and the like are formed near the grooves 131, 41a through 41h in the plate 77.

In this embodiment, the inflow passage 13 is constructed by the groove 131. In other words, in the state where the case 76, the plate 77 and the liquid-tight sheet 78 are overlapped together, the upper face of the groove 131 is closed and the inflow side active valve 15 is disposed in the inflow passage 13. Further, when the case 76, the plate 77 and the liquid-tight sheet 78 are overlapped together, the outflow passages 4a through 4h are formed by the grooves 41a through 41h, 42a, 42b and the like and the outflow side active valves 6a through 6h are disposed in the respective outflow passages 4a through 4h. When the case 76, the plate 77 and the liquid-tight sheet 78 are overlapped together, the first flow passage 8 is constructed by the groove 82, the recessed part 83 of the case 76 and the recessed part 84 of the plate 77, and the second flow passage 9 is constructed by the groove 92, the recessed part (not shown) of the case 76 and the recessed part 94 of the plate 77. The passive valves 110, 111 are arranged in the recessed parts 84, 94 of the plate 77 in the first flow passage 8 and the second flow passage 9.

As described above, in this embodiment, since the outflow side active valves 6 (6a through 6h) are disposed around the pump chamber 2 in a plane manner, the flow passage of each of a plurality of the outflow passages 4 (4a through 4h) can be shortened and the thickness of the pump device 10 can be reduced. Further, since the variation of the discharge amount from the respective outflow passages 4 (4a through 4h) can be reduced, an appropriate amount of fluid is discharged accurately. Further, although a plurality of outflow passages 4 (4a through 4h) requires a plurality of outflow side active valves 6 (6a through 6h), since a plurality of the outflow side active valves 6 (6a through 6h) is disposed around the pump chamber 2 in a plane manner, the flow passages of a plurality of the outflow passages 4 (4a through 4h) can be shortened and thus the size of the pump device 10 can be reduced.

Further, in a plurality of the outflow passage 4 (4a to 4h) in this embodiment, the lengths of the flow passages from the pump chamber 2 to the outflow side active valves 6 (6a through 6h) are equal to each other. Therefore, the discharge amount through the respective outflow passages 4 (4a through 4h) can be controlled with a high degree of accuracy.

Further, in this embodiment, the inflow port 80, the return flow port 90 and a plurality of the outflow ports 40 (40a through 40h) are opened in the same face 271 of the main body 17 of the pump device, and thus the connection between the pump device 10 and the outside is easily performed.

In addition, the wiring circuit board 74 for the inflow side active valve 15, the pump mechanism 113 and the outflow side active valves 6 is overlapped on the surface opposite to the surface where the inflow port 80, the return flow port 90 and a plurality of the outflow ports 40 (40a to 40h) are opened in the main body 17 of the pump device. Therefore, when pipes are to be connected to the inflow port 80, the return flow port 90 and a plurality of the outflow ports 40 (40a through 40h), the wiring between the wiring circuit board 74 and the respective active valves 15, 6 and the pump mechanism 113 is easily performed.

The main body 17 of the pump device is provided with the plate 77 in which the inflow passage 13 and the outflow passages 4 are formed on one face side in a groove-shaped manner and the liquid-tight sheet 78 which is overlapped on one face side of the plate 77. Therefore, many flow passages can be formed in a small-sized main body 17 of the pump device and the pump device 10 can be efficiently produced.

Next, an embodiment of the pump mechanism 113 which is used in the pump device 10 to which the present invention is applied will be described below. FIG. 16 is an exploded perspective view showing a state where the pump device is longitudinally divided. FIG. 17(a) is an explanatory view showing a state where the internal volume of a pump chamber is expanded in the pump device shown in FIG. 16, and FIG. 17(b) is an explanatory view showing a state where the internal volume of the pump chamber is contracted. FIG. 18(a) is a perspective view showing a rotor used in a rotation body of a pump mechanism shown in FIG. 16, FIG. 18(b) is its plan view, and FIG. 18(c) is its cross-sectional view. FIG. 19(a) is a perspective view showing a movable body used in the rotation body of the pump mechanism shown in FIG. 16, FIG. 19(b) is its plan view and FIG. 19(c) is its sectional view.

In FIG. 16 and FIG. 17(a), the pump mechanism 113 in accordance with an embodiment includes a diaphragm valve 170 as a valve element, which expands and contracts the internal volume of the pump chamber 2 in communication with the inflow passage 13 and the outflow passage 4 to suck and discharge liquid, and a drive mechanism 105 which drives the diaphragm valve 170.

The fixed body side portion of the main body 17 of the pump device includes the plate-shaped base 75 on which the drive mechanism 105 is mounted, the case 76 which accommodates the drive mechanism 105 between together with the base 75, the plate 77 overlapped on the upper face of the case 76, and the cover 79 which is overlapped on the upper face of the plate 77 through the liquid-tight sheet 78. The grooves 131, 41 are formed on the upper face of the plate 77 and the groove 131 and the like construct a flow passage when their upper faces are covered with the cover 79. A through hole 151 is formed at one end part of the groove 131 in the plate 77. In the state where the base 75, the case 76, the plate 77, the liquid-tight sheet 78 and the cover 79 are overlapped together, the through hole 151 is in communication with the through holes 271, 211 which are formed in the case 76 and the base 75, and the fluid suction port 6 is constructed by the through holes 151, 271, 211. Further, a through hole 153 is formed at other end part of the groove 41 in the plate 77. In the state where the base 75, the case 76, the plate 77, the liquid-tight sheet 78 and the cover 79 are overlapped together, the through hole 153 is in communication with the through holes 133, 123 which are formed in the case 76 and the base 75, and the fluid discharge port 7 is constructed by the through holes 153, 133, 123. Check valves (not shown) are respectively disposed at the fluid suction port 6 and the fluid discharge port 7.

The through hole 21 is formed at a middle position of the groove 131 in the plate 77. The upper face of the through hole 21 is covered with the cover 79 in the state where the cover 79 is overlapped on the plate 77 and the under side of the through hole 21 is covered by the diaphragm valve 170 to construct the pump chamber 2.

In accordance with an embodiment, the drive mechanism 105 includes, as described below, a ring-shaped stator 120, a rotation body 103 which is coaxially disposed on the inner side of the stator 120, a movable body 160 which is coaxially disposed on the inner side of the rotation body 103, and a conversion mechanism 140 which converts the rotation of the rotation body 103 into a force which moves the movable body 160 in an axial direction. The drive mechanism 105 is mounted in a space formed in the case 76 between the base 75 and the case 76.

In the drive mechanism 105, the stator 120 includes a unit which is provided with a coil 121 wound around a coil bobbin 123 and two pieces of yoke 125 disposed so as to cover the coil 121. Two units are overlapped each other in the axial direction to construct the stator 120. In this state, in both of the upper and the lower units, the pole teeth protruded in the axial direction from the inner peripheral edge parts of two yokes 125 are alternately located in the circumferential direction.

As shown in FIG. 16, FIG. 17 and FIGS. 18(a), 18(b), 18(c), the rotation body 103 is provided with a cup shaped member 130 which opens upward, and a ring-shaped rotor magnet 150 which is fixed on the outer peripheral face of a cylindrical body part 131 of the cup shaped member 130. A recessed part 135 upwardly dented in the axial direction is formed at the center of a bottom wall part 133 of the cup shaped member 130. A bearing part 751 which receives a ball 118 disposed in the recessed part 135 is formed in the base 75. Further, a ring-shaped stepped part 766 is formed in the inner face on the upper end side of the case 76 and a ring-shaped stepped part which faces the ring-shaped stepped part 766 of the case 76 is formed by the upper end portion of the body part 131 and a ring-shaped flange part 134 in the upper end portion of the cup shaped member 130. A ring-shaped retainer 181 and a bearing 180 are disposed in an annular space which is formed by these ring-shaped stepped parts. The bearing 180 comprises bearing balls 182 which are held at separated positions in the circumferential direction by the retainer 181. In this manner, the rotation body 103 is supported by the main body 17 of the pump device in the rotatable manner around the axial line.

In the rotation body 103, the outer peripheral face of the rotor magnet 150 faces the pole teeth located in the circumferential direction along the inner circumferential face of the stator 120. An S-pole and N-pole are alternately disposed in the circumferential direction on the outer peripheral face of the rotor magnet 150 and the stator 120 and the cup shaped member 130 constructs a stepping motor.

As shown in FIG. 16, FIG. 17, and FIGS. 19(a), 19(b), 19(c), the movable body 160 is provided with a bottom wall part 161, a cylindrical part 163 which protrudes in the axial direction from the center of the bottom wall part 161, and a body part 165 which is formed in a cylindrical shape so as to surround around the cylindrical part 163. A male screw 167 is formed on the outer peripheral face of the body part 165.

In accordance with an embodiment, as shown in FIG. 16, FIG. 17, FIGS. 18(a), 18(b), 18(c) and FIGS. 19(a), 19(b), 19(c), a female screw part 137 is formed at four portions separated in the circumferential direction on the inner circumferential face of the body part 131 of the cup shaped member 130. Further, a male screw part 167 is formed on the outer peripheral face of the body part 165 of the movable body 160 to construct a power transmitting mechanism 141 by engaging the male screw part 167 with the female screw part 137 of the cup shaped member 130. In this manner, a conversion mechanism 140 is constructed in which the movable body 160 is moved back and forth in the axial direction by the rotation of the rotation body 103. Accordingly, when the movable body 160 is disposed on the inner side of the cup shaped member 130 such that the male screw part 167 meshes with the female screw part 137, the movable body 160 is supported on the inner side of the cup shaped member 130. Further, six elongated holes 169 are formed in the bottom wall part 161 of the movable body 160 as a through hole in the circumferential direction. Six projections 769 are extended from the case 76 and the lower end part of the projection 769 is fitted into the elongated slot 169 to construct a co-rotation preventive mechanism 149. In other words, when the cup shaped member 130 is rotated, the rotation of the movable body 160 is prevented by the co-rotation preventive mechanism 149 comprised of the projection 769 and the elongated slot 169. Therefore, the rotation of the cup shaped member 130 is transmitted to the movable body 160 through the power transmitting mechanism 141 comprised of its female screw part 137 and the male screw part 167 of the movable body 160 and thus the movable body 160 linearly moves on one side or the other side in the axial direction based on the direction of the rotation of the rotation body 103.

In this embodiment, four female screw parts 137 are separately formed on the inner circumferential face of the body part 131 of the cup shaped member 130 in the circumferential direction. However, a plurality of female screw parts may be separately formed in the circumferential direction. Further, in this embodiment, four female screw parts 137 are separately formed on the inner circumferential face of the body part 131 of the cup shaped member 130 in the circumferential direction. However, alternatively, four or a plurality of male screw parts 167 may be separately formed on the outer peripheral face of the body part 165 of the movable body 160 in the circumferential direction.

In FIG. 16 and FIG. 17(*a*), in this embodiment, the diaphragm valve 170 is directly connected to the movable body 160. The diaphragm valve 170 is formed in a cup shape and provided with a bottom wall part 171, a cylindrical body part 173 which is formed in the axial direction from the outer peripheral edge part of the bottom wall part 171, and a flange part 175 which is extended on the outer peripheral side from the upper end of the body part 173. The diaphragm valve 170 and the movable body 160 are fixed to each other by a screw 178 and a cap 179 from upper and lower sides such that the central portion of the bottom wall part 171 covers over the cylindrical part 163 of the movable body 160. Further, the outer peripheral edge part of the flange part 175 of the diaphragm valve 170 is formed to be a thick wall part which is provided with a liquid-tight property and a positioning function. The thick wall part is fixed between the case 76 and the plate 77 around the through hole 21 of the plate 77. In this manner, the diaphragm valve 170 defines the under portion of the pump chamber 2 and the liquid-tightness between the case 76 and the plate 77 is ensured around the pump chamber 2.

In this state, the body part 173 of the diaphragm valve 170 is folded in a U-shape in cross section and the shape of the folded portion 172 varies according to the position of the movable body 160. In this embodiment, the folded portion 172 of the diaphragm valve 170 in the U-shape in cross section is disposed in an annular space which is constructed between the first wall face 168 that is the outer peripheral face of the cylindrical part 163 of the movable body 160 and the second wall face 768 that is the inner circumferential face of the projection 769 extended from the case 76. Therefore, in either of the state shown in FIGS. 17(*a*), 17(*b*), and the midway state reaching to the state shown in FIGS. 17(*a*), 17(*b*), the folded portion 172 of the diaphragm valve 170 is deformed so as to be extended or folded along the first wall face 168 and the second wall face 768 while the folded portion 172 is held in the annular space.

Further, in this embodiment, as shown in FIG. 16, FIG. 17(*a*) and FIGS. 18(*a*), 18(*b*), 18(*c*), a groove 136 is formed in the bottom wall part 133 of the cup shaped member 130 with an angular range of 270° in the circumferential direction and a projection 166 is formed downward from the bottom face of the movable body 160. The movable body 160 does not rotate around its axial line but moves in the axial direction and, on the contrary, the rotation body 103 rotates around its axial line but does not move in the axial direction. Therefore, the projection 166 and the groove 136 function as a stopper which determines a stop position of the rotation body 103 and the movable body 160. In other words, the depth of the groove 136 varies in the circumferential direction. When the movable body 160 moves downward in the axial direction, the projection 166 fits into the groove 136 and the end part of the groove 136 abuts with the projection 166 due to the rotation of the rotation body 103. As a result, the rotation of the rotation body 103 is prevented and the stop positions of the rotation body 103 and the movable body 160 are determined, in other words, the maximum expanded position in the internal volume of the diaphragm valve 170 is determined.

In the pump mechanism 113 constructed as described above, when electrical power is supplied to the coils 121 of the stator 120, the cup shaped member 130 is rotated and its rotation is transmitted to the movable body 160 through the conversion mechanism 140. Therefore, the movable body 160 performs a reciprocal linear motion in the axial direction. As a result, the diaphragm valve 170 is deformed by the movement of the movable body 160 and the internal volume of the pump chamber 2 is expanded or contracted. Therefore, the inflow of liquid from the inflow passage 13 and the outflow of the liquid to the outflow passage 4 are performed in the pump chamber 2. During this time, the folded portion 172 of the diaphragm valve 170 is deformed so as to be extended or folded along the first wall face 168 and the second wall face 768 while the folded portion 172 is located in the annular space, and thus excessive sliding does not occur. In addition, even when pressure is applied from fluid in the pump chamber 2, the deformation of the diaphragm valve 170 is extremely little because the inner side and the outer side of the diaphragm valve 170 are regulated in the annular space. Further, the downward position of the movable body 160 is regulated by the stopper which is constructed with the groove 136 of the cup shaped member 130 and the projection 166 of the movable body 160. As a result, the volume is varied by the diaphragm valve 170 with a high degree of accuracy with the rotation of the cup shaped member 130.

As described above, in the pump mechanism 113 in accordance with an embodiment, the rotation of the rotation body 103 by the stepping motor mechanism is transmitted to the movable body 160 through the conversion mechanism 140 utilizing the power transmitting mechanism 141 provided with the male screw part 167 and the female screw part 137 and thus the movable body 160 to which the diaphragm valve 170 is fixed is linearly moved in the reciprocal manner. Therefore, since power is transmitted with less members from the drive mechanism 105 to the diaphragm valve 170, downsizing, thickness reduction and cost reduction of the pump mechanism 113 can be attained. Further, when the lead angle of the male screw part 167 and the female screw part 137 in the power transmitting mechanism 141 is set to be small, or when the number of the pole teeth of the stator of the motor is increased, small feeding of the movable body 160 can be performed. Therefore, since the volumetric capacity of the pump chamber 2 can be finely controlled, a constant amount of discharge can be performed with a high degree of accuracy.

The diaphragm valve 170 is used in this embodiment and the folded portion 172 of the diaphragm valve 170 is deformed so as to be extended or folded along the first wall face 168 and the second wall face 768 while the folded portion 172 is located in the annular space, and thus excessive sliding does not occur. Therefore, useless load is not generated and thus service life of the diaphragm valve 170 becomes longer. Further, even when pressure is applied from the fluid in the pump chamber 2, the deformation of the diaphragm valve 170 is extremely little Therefore, according to the pump mechanism 113 in this embodiment, a constant amount of discharge can be performed with a high degree of accuracy and a high degree of reliability can be obtained.

In addition, the rotation body 103 is rotatably supported around the axial line through the bearing ball 182 in the main body 17 of the pump device and thus sliding loss is small. Further, since the rotation body 103 is stably held in the axial direction, thrust in the axial direction is stable. Therefore, downsizing and the improvements of durability and discharging performance of the drive mechanism 105 can be attained.

In the embodiment described above, a screw is utilized for the power transmitting mechanism 141 of the conversion mechanism 140 but a cam groove may be utilized. Further, in the embodiment described above, the cup-shaped diaphragm valve is used as a valve element but a diaphragm valve in another shape or a piston provided with an O-ring may be used.

In the embodiment described above, one inflow port 80 and eight outflow ports 40 are provided but a plurality of inflow ports 80 may be provided. Further, the respective numbers of the inflow port 80, the pump mechanism 113 and the outflow port 40 may be only one and any number may be used. Further, in the embodiment described above, the lengths of the outflow passages 4 are respectively set to be equal but the outflow passages 4 may be formed with different lengths according to application to be used. Further, in the embodiment described above, the return flow port 90 is provided but, when not required, it may not be provided. In addition, in the embodiment described above, the liquid-tight sheet 78 for closing the upper face of the plate 77 and the cover 79 to which the above-mentioned pipes are coupled are separately provided. However, it may be constructed that the pipes are not coupled to the cover 79 but to the liquid-tight sheet 78 which is provided with only outflow holes to which the pipes are connected through a sealing member. The sealing member may be constructed so as to directly attach the plate 77 to the cover 79 or the sealing member may be provided at the end portions of the flow passages in the plate 77.

FIG. 20 is an explanatory perspective cross-sectional view showing an essential portion of a valve in which the pump device 10 to which the present invention is applied is used as an active valve which is cut in an axial direction and viewed from obliquely above. FIG. 21 is an explanatory view showing the magnetic lines of force in the valve shown in FIG. 20.

As shown in FIGS. 20 and 21, the active valve 15, 6 are provided with a linear actuator 201 in the holes 57, 67a through 67h in the case 76. The linear actuator 201 includes a cylindrical fixed body 203 and a roughly cylindrical movable body 205 disposed in the inner side of the fixed body 203. The fixed body 203 includes a coil 233 wound around a bobbin 231 in a ring-shaped manner and a fixed body side yoke 235 which is formed such that one front end part 236a and the other front end part 236b face each other on the inner peripheral side of the coil 233 in an axial direction via a slit 27 through both sides in the axial direction of the coil 233 from the outer peripheral side of the coil 233. The movable body 205 includes a first movable body side yoke 251 in a circular disk shape and a pair of magnets 253a, 253b which are laminated on both sides in the axial direction of the first movable body side yoke 251. Rare earth magnet of Nd—Fe—B system or Sm—Co system, or resin magnet may be used as a pair of the magnets 253a, 253b. In the movable body 205, second movable body side yokes 255a, 255b are laminated on the end faces of a pair of the respective magnets 253a, 253b opposite to the first movable body side yoke 251.

In accordance with an embodiment, each of the magnets 253a, 253b is magnetized in the axial direction and same polarities are positioned on the first movable body side yoke 251. In this embodiment, a pair of the magnets 253a, 253b are disposed such that their N-poles are positioned on the first movable body side yoke 251 and their S-poles are positioned on the outer side in the axial direction. However, the magnetized direction may be reversed.

The outer peripheral face of the first movable body side yoke 251 is protruded on the outer side from the outer peripheral face of the magnets 253a, 253b. Further, the outer peripheral faces of the second movable body side yokes 255a, 255b are protruded on the outer side from the outer peripheral faces of the magnets 253a, 253b.

Recessed parts are formed on both end faces in the axial direction of the first movable body side yoke 251 and a pair of the magnets 253a, 253b are fitted to the respective recessed parts and fixed with an adhesive or the like. The first movable body side yoke 251, a pair of the magnets 253a, 253b and the second movable body side yokes 255a, 255b may be fixed by adhesion, press fitting or both of them.

Bearing plates 271a, 271b (bearing member) are fixed in the aperture parts on both sides in the axial direction of the fixed body 203. Support shafts 257a, 257b which are protruded on both sides in the axial direction from the second movable body side yokes 255a, 255b are slidably inserted into the holes of the bearing plates 271a, 271b. In this manner, the movable body 205 is supported by the fixed body 203 in the state that the movable body 205 is movable up and down in the axial direction. In this state, the outer peripheral face of the movable body 205 faces the inner peripheral surface of the fixed body 203 through a prescribed gap space and the front end parts 236a, 236b of the fixed body side yoke 235 face each other in the axial direction in a gap space formed between the outer peripheral face of the first movable body side yoke 251 and the inner peripheral surface of the coil 233. Further, a clearance is formed between the movable body 205 and the fixed body side yoke 235. The second movable body side yokes 255a, 255b and the support shafts 257a, 257b are fixed to each other by adhesion, press fitting or both of them.

In the linear actuator 201 constructed as described above, when an electric current is supplied to the coil 233 so as to flow toward near side from far side in the right side in the drawing and, in the left side in the drawing, from near side toward far side, the magnetic lines of force are expressed as shown in FIG. 21. Therefore, the movable body 205 receives an downward thrust in the axial direction due to the Lorentz force and moves down as shown by the arrow "A". On the contrary, when energizing direction to the coil 233 is reversed, the movable body 205 moves up along the axial direction as shown by the arrow "B".

In the linear actuator 201 in accordance with this embodiment, the movable body 205 is moved by utilizing magnetic force, and a coiled spring 291 in a truncated cone shape is disposed as an urging member on one side in the axial direction between the bearing plate 271a and the second movable body side yokes 255a. Therefore, when the movable body 205 moves down, the movable body 205 moves at a low speed while deforming the compression spring and, when the movable body 205 moves up, the movable body 205 moves at a high speed with the aid of returning force of the shape of the compression spring.

In the linear actuator 201 constructed as described above in accordance with this embodiment, the end part of one support shaft 257b is connected to the central portion of the diaphragm valve 260 which is disposed in the valve chamber 270 (recessed part 58, 68a through 68h). A ring-shaped thick wall part 261, which functions as liquid-tightness and positioning, is formed on the outer peripheral side of the diaphragm valve 260. Therefore, liquid-tightness is ensured by the outer peripheral side of the diaphragm valve 260 including the ring-shaped thick wall part 261 which is sandwiched between the case 76 and the plate 77.

The valve element is not limited to the diaphragm valve 260 and a bellows valve and other types of a valve element may be used. The support shafts 257a, 257b and the valve elements may be connected to each other or the support shafts 57a, 57b and the valve elements may be integrally formed.

As described above, in this embodiment, a pair of the magnets 253a, 253b of the movable body 205 are disposed such that their same polarities are faced to each other and magnetic repulsive forces are operated between them. However, since the first movable body side yoke 251 is disposed between the magnets 253a, 253b, a pair of the magnets 253a, 253b can be fixed in the state where their same polarities are faced to each other.

Further, a pair of the magnets 253a, 253b of the movable body 205 are disposed such that their same polarities are faced to the first movable body side yoke 251. Therefore, strong magnetic flux is generated from the first movable body side yoke 251 in the radial direction. Accordingly, when the peripheral faces of the first movable body side yoke 251 and the coil 233 are faced to each other, a large thrust can be applied to the movable body 205.

In addition, since the magnets 253a, 253b are magnetized in the axial direction, magnetizing is easy and suitable for mass production even when the magnets are miniaturized, which is different from the case where the magnets 253a, 253b are magnetized in the radial direction.

Moreover, in this embodiment, the outer peripheral face of the first movable body side yoke 251 is protruded on the outer side from the outer peripheral faces of a pair of the magnets 253a, 253b. Therefore, even when the fixed body side yoke 235 is provided, magnetic attraction force applied to the movable body 205 in the direction perpendicular to the axial direction can be reduced. Similarly, the outer peripheral faces of the second movable body side yokes 255a, 255b are protruded on the outer side from the outer peripheral faces of a pair of the magnets 253a, 253b. Therefore, even when the fixed body side yoke 235 is provided, magnetic attraction force applied to the movable body 205 in the direction perpendicular to the axial direction can be reduced. Accordingly, assembling operation is easily performed and the movable body 205 is hard to be inclined.

Further, in this embodiment, the magnets 253a, 253b are disposed on the inner side of the coil 233. Therefore, in comparison with the case where the magnets 253a, 253b are disposed on the outer side of the coil 233, the magnets 253a, 253b can be made smaller and thus the active valves 15, 6 can be constructed at a low cost. Further, since the coil 233 is disposed on the outer side, magnetic path can be closed only with the fixed side yoke.

In addition, the bearing plates 271a, 271b which movably support the support shafts 257a, 257b in the axial direction are held in the aperture parts opened in the axial direction of the fixed body 203. Therefore, other bearing members are not required to be disposed separately. Further, since the bearing plates 271a, 271b can be fixed with the fixed body 203 as a reference, the support shafts 257a, 257b may not be inclined.

The application of the pump device in accordance with the embodiment is not limited to a fuel cell. For example, the pump device may be used in a field of an analyzing device for chemical substance and may be used in substitution for a plurality of cylinder pump which is used in a dropping device of trace reagent.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A pump device comprising:
a fixed body in which a pump chamber in communication with a fluid suction port and a fluid discharge port is constructed;
a valve element for expanding and contracting an internal volume of the pump chamber to perform suction and discharge of fluid; and
a drive mechanism for driving the valve element which comprises:
   a ring-shaped stator including a coil;
   a rotation body including a rotor magnet whose peripheral face faces a peripheral face of the stator;
   a movable body to which the valve element is fixed; and
   a conversion mechanism in which rotation of the rotation body is converted to movement of the movable body in the axial direction, which comprises:
      a power transmitting mechanism which is provided with a screw groove or a cam groove between the rotation body and the movable body; and
      a co-rotation preventive mechanism which prevents the movable body from co-rotating with the rotation body;
wherein the rotation body comprises a cup-shaped member that is coaxially disposed on an inner side of the stator;
the movable body is provided with a cylindrical center part at a center of the movable body that is coaxially disposed on an inner side of the cup-shaped member;
the valve element is a diaphragm valve that partitions the pump chamber;
an outer peripheral edge part of the diaphragm valve is fixed to the fixed body;
a center part of the diaphragm valve is fixed to the cylindrical center part of the movable body;
a cylindrical body part between the outer peripheral edge part and the center part of the diaphragm valve is disposed so that a U-shaped portion is formed on the inner side of the cup-shaped member of the rotation body; and
the U-shaped portion of the cylindrical body part is moved on the inner side of the cup-shaped member of the rotation body when the internal volume of the pump chamber is expanded and contracted by the diaphragm valve.

2. The pump device according to claim 1, wherein
the fixed body is provided with a second wall face which faces a first wall face of the cylindrical center part of the movable body which is extended in the axial direction to form an annular space between the first wall face and the second wall face, and
the cylindrical body part forms an annular portion between the center part and the outer peripheral edge part of the diaphragm valve, and the annular portion of the diaphragm valve is folded in a U-shape in cross section in the annular space so that the U-shaped portion is formed.

3. The pump device according to claim 2, wherein
the movable body is provided with a flange part which is extended on an outer peripheral side,
a plurality of holes is formed in a peripheral direction in the flange part,
the second wall face is provided with a plurality of projections which is extended in the axial direction from a peripheral portion of the fixed body, and
a plurality of the projections is fitted into a plurality of the holes to construct the co-rotation preventive mechanism.

4. The pump device according to claim 1, further comprising a bearing ball which rotatably supports the rotation body around an axial line with respect to the fixed body.

5. The pump device according to claim 1, further comprising a stopper for regulating a stop position of the rotation body.

6. The pump device according to claim 1, wherein the power transmitting mechanism and the co-rotation preventive mechanism are arranged on the inner side of the cup-shaped member of the rotation body.

* * * * *